United States Patent
Fukamachi et al.

(10) Patent No.: US 10,991,105 B2
(45) Date of Patent: Apr. 27, 2021

(54) IMAGE PROCESSING DEVICE

(71) Applicant: TOYOTA JIDOSHA KABUSHIKI KAISHA, Toyota (JP)

(72) Inventors: Hideo Fukamachi, Hadano (JP); Toshiki Kindo, Yokohama (JP); Mineki Soga, Nisshin (JP); Yoichi Kato, Nagoya (JP); Shigeru Ando, Chiba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/565,711

(22) Filed: Sep. 10, 2019

(65) Prior Publication Data
US 2020/0098115 A1   Mar. 26, 2020

(30) Foreign Application Priority Data
Sep. 25, 2018 (JP) .............................. JP2018-179121

(51) Int. Cl.
*G06T 7/246* (2017.01)
*G06K 9/00* (2006.01)
(Continued)

(52) U.S. Cl.
CPC .......... *G06T 7/248* (2017.01); *G06K 9/00805* (2013.01); *G06T 5/003* (2013.01);
(Continued)

(58) Field of Classification Search
CPC .......... G06T 7/248; G06T 5/003; G06T 5/50; G06K 9/00805; G06K 2209/21
(Continued)

(56) References Cited

U.S. PATENT DOCUMENTS

2006/0062432 A1   3/2006   Watanabe et al.
2008/0107307 A1   5/2008   Altherr
(Continued)

FOREIGN PATENT DOCUMENTS

JP   2006-092117 A   4/2006
JP   2006-170961 A   6/2006
(Continued)

OTHER PUBLICATIONS

Yao-Yi Cai., "A Fast Vehicle Borne Real-time Video Stabilization Method", Computer Knowledge and Technology, vol. 6, No. 13, May 1, 2010, XP055678710, pp. 3466-3469, ( 4 pages total).

*Primary Examiner* — Ayodeji O Ayotunde
(74) *Attorney, Agent, or Firm* — Sughrue Mion, PLLC

(57) ABSTRACT

An image processing device includes a storage unit, an initial setting unit configured to store a position of an optical axis neighborhood point in a first image obtained by the imaging unit in the storage unit as an initial position of a specific point in the first image in association with image features of a surrounding area of the optical axis neighborhood point, a search unit configured to search for a corresponding point of the specific point in a second image obtained by the imaging unit based on the image features of the surrounding area of the specific point stored in the storage unit, and an output unit configured to output a position of the corresponding point in the second image as a position of the reference point in the second image.

6 Claims, 16 Drawing Sheets

(51) Int. Cl.
  *G06T 5/00* (2006.01)
  *G06T 5/50* (2006.01)
(52) U.S. Cl.
  CPC ............ *G06T 5/50* (2013.01); *G06K 2209/21* (2013.01); *G06T 2207/10016* (2013.01); *G06T 2207/20201* (2013.01); *G06T 2207/30252* (2013.01)
(58) Field of Classification Search
  USPC ........................................................ 382/103
  See application file for complete search history.

(56) References Cited

U.S. PATENT DOCUMENTS

| | | | |
|---|---|---|---|
| 2009/0169052 A1* | 7/2009 | Seki | ........................ G06T 7/74 382/103 |
| 2010/0128927 A1* | 5/2010 | Ikenoue | ............. G06K 9/00261 382/103 |
| 2013/0307982 A1 | 11/2013 | Kawai | |

FOREIGN PATENT DOCUMENTS

| | | |
|---|---|---|
| JP | 2007-104516 A | 4/2007 |
| JP | 2007-336235 A | 12/2007 |
| JP | 4159226 B2 | 10/2008 |
| JP | 4217143 B2 | 1/2009 |
| JP | 2010-135964 A | 6/2010 |
| JP | 2013-238497 A | 11/2013 |

\* cited by examiner

IMAGE PROCESSING DEVICE

CROSS-REFERENCE TO RELATED APPLICATIONS

This application is based on and claims the benefit of priority from Japanese Patent Application No. 2018-179121 filed on Sep. 25, 2018, and the entire contents of which are incorporated herein by reference.

TECHNICAL FIELD

The present disclosure relates to an image processing device.

BACKGROUND

Japanese Unexamined Patent Publication No. 2006-170961 discloses a device for processing an image obtained by an imaging unit such as an in-vehicle camera. The device detects a center position (a vanishing point) of displacement in the image displaced by a vibration of the vehicle. The device monitors the vanishing point to calculate an amount of displacement of the image caused by the vibration of the vehicle in the captured image.

Specifically, the device performs a frequency analysis (Fourier transform) based on a history of the coordinates of the detection area, and creates a graph illustrating a relationship between a vibration frequency and a power spectrum intensity indicating an intensity of each frequency in the detection area. In this way, the frequency having the highest power spectrum intensity is specified. A predetermined frequency band including the above-described frequency is extracted using a band pass filter. Subsequently, inverse Fourier transform is performed on the extracted predetermined frequency band, and then, a temporal change in the amount of displacement in the predetermined frequency band within the detection area can be obtained. An image (balanced image) captured at a time when the amount of displacement is 0 is an image captured when the camera is not receiving an influence of the vibration which is normally occurring in the vehicle. An optical flow is calculated based on a longitudinal motion of lateral edges of a plurality of balanced images. As a result, an image velocity and a velocity direction in the longitudinal direction are calculated in the balanced image. By subtracting an average value of the image velocity of the balanced image from the image velocity of the image captured by the camera, an image velocity can be obtained, which is a result of removing the image velocity generated by the normal vibration of the vehicle. The coordinate axes are set in the horizontal center of the image velocity corrected as described above, coordinates having the lowest movement velocity on the coordinate axis are set as the coordinates of the vanishing point. Using this vanishing point as a reference, a blur correction between the images can be performed.

SUMMARY

Incidentally, when recognizing a recognition target such as a vehicle, a pedestrian, a sign, a signal, lanes or the like based on an image obtained by an imaging unit mounted on a vehicle, the recognition accuracy can be improved by using a plurality of images. In order to recognize the recognition target using a plurality of images, it is necessary to associate the recognition objects in each image with each other. When there is a motion in the imaging unit caused by the vibration of the vehicle or the like, since a coordinate variation of the image occurs, it is difficult to associate the recognition targets in each image with each other.

Japanese Unexamined Patent Publication No. 2006-170961 discloses a device that associates the recognition targets in each image with each other using the estimated vanishing point as described above. However, in the device disclosed in Japanese Unexamined Patent Publication No. 2006-170961, there are cases where the recognition targets cannot be sufficiently associated in each image with each other. For example, when there is a vibration component having a frequency higher than the frame rate of the camera, even if the frequency analysis is performed on a time elapse of the y coordinate value of the detection area, there is a problem in that the device disclosed in Japanese Unexamined Patent Publication No. 2006-170961 may not be able to correctly detect the balanced image or the image velocity of the balanced image. Since the image velocity of the balanced image is the average of the image velocity at the time when the amount of displacement becomes 0, there is a problem in that the device disclosed in Japanese Unexamined Patent Publication No. 2006-170961 may not be able to correctly correct the image velocity of the image of another time point. Furthermore, when the vehicle travels along a curved road, it is difficult for the device disclosed in Japanese Unexamined Patent Publication No. 2006-170961 to detect the vanishing point, and there is a problem in that the amount of displacement of the image cannot be correctly obtained.

The present disclosure provides an image processing device that can associate the recognition targets in each image with each other even when there is a motion in the imaging unit.

According to an aspect of the present disclosure, there is provided an image processing device configured to set a reference point on an image obtained by an imaging unit moving in an optical axis direction. The device includes: a storage unit; an initial setting unit configured to store a position of an optical axis neighborhood point in a first image obtained by the imaging unit in the storage unit as an initial position of a specific point in the first image in association with image features of a surrounding area of the optical axis neighborhood point; a search unit configured to search for a corresponding point of the specific point in a second image obtained by the imaging unit based on the image features stored in the storage unit; and an output unit configured to output a position of the corresponding point in the second image as a position of the reference point in the second image.

According to the image processing device in the aspect of the present disclosure, the position of the optical axis neighborhood point in the first image obtained by the imaging unit moving in the optical axis direction is set as the initial position of the specific point. The optical axis neighborhood point is a point where the motion vector caused by the variation of the rolling angle and the translational movement is small. The position of the optical axis neighborhood point is stored as a specific point in association with the image features of the surrounding area of the optical axis neighborhood point. Using this specific point, the first image and the second image are associated with each other. The corresponding point in the second image corresponding to the specific point in the first image is searched based on the image features of the surrounding area of the optical axis neighborhood point. The searched corresponding point is the reference point in the second image. The reference point is a reference position when associating the first image with the second image, and for example, is a reference position of the relative position coordinates in the second image. At this time, in the first image, the specific point is a reference of the relative position coordinates. Even if the imaging unit has a fast rotational movement component, the device can associate the recognition targets in each image with each other by setting the reference point in the second image using the optical axis neighborhood point in the first image. Furthermore, since the method of association by the device does not depend on the image at the time point of specific displacement amount, it is possible to correctly set the reference point at all time points of image capturing. In addition, since the method of association by the device does not use the vanishing point as the reference point, it is possible to correctly calculate the motion vector even when the vanishing point cannot be detected.

The image processing device according the aspect of the present disclosure may further include a motion vector calculation unit configured to calculate a relative motion vector between a pixel and the reference point in each pixel of the second image. The difference between the output position of the reference point and the position of the specific point stored in the storage unit is a motion vector from a time point when the specific point is stored in the storage unit to a time point when the second image is generated, and is caused by the variations of the pitch angle and yaw angle. Therefore, the image processing device can compensate the coordinate variation caused by the variations of the pitch angle and yaw angle by calculating the relative motion vector, which is the relative motion between the pixel and the reference point.

According to another aspect of the present disclosure, there is provided an image processing device configured to estimate a rotational movement of an imaging unit moving in an optical axis direction, based on an image obtained by the imaging unit. The device includes: a setting unit configured to set an optical axis neighborhood point in the image as a specific point; a first estimation unit configured to estimate a rotational velocity component of at least one axial rotation of a first axis and a second axis parallel to an imaging plane of the imaging unit, orthogonal to each other among the rotational velocity components, based on a motion vector in the surrounding area of the specific point; and a second estimation unit configured to estimate a rotational velocity component of an axial rotation of a third axis, which is a straight line connecting the specific point and an optical center of the imaging unit, based on the rotational velocity component estimated by the first estimation unit, a constraint condition assuming that a brightness value of the imaging target does not change due to a relative movement between the imaging unit and the imaging target, and a relationship between the movement of the imaging unit and the motion vector of each pixel on the image.

According to the image processing device in the other aspect of the present disclosure, the position of the optical axis neighborhood point in the image obtained by the imaging unit moving in the optical axis direction is set as the position of the specific point. The rotational velocity component of the axial rotation of at least one of the first axis and the second axis parallel to each other and orthogonal to the imaging plane of the imaging unit among the rotational velocity components is estimated based on the motion vector in the surrounding area of the specific point. The rotational velocity component of the axial rotation of the third axis which is a straight line connecting the specific point and the optical center of the imaging unit is estimated based on the rotational velocity component estimated by first estimation unit, the constraint condition assuming that the brightness value of the imaging target does not change due to the relative movement of the imaging unit and the imaging target, and the relation between movement of the imaging unit and the motion vector of each pixel on the image. If the rotational velocity components of two or three axial rotations are estimated at a time, the equation for the estimation will have a plurality of unknowns. The rotational velocity component of the axial rotation of the third axis has a considerably smaller value than the rotational velocity component of the first axis and the second axis. When a plurality of unknowns including a large value and a small value are simultaneously estimated, the estimation is driven by the large value component, and thus, the error of the small value component increases. The device divides the estimation into two, such as the estimation of the rotational velocity component of the axial rotation of at least one of the first axis and the second axis and the estimation of the rotational velocity component of the axial rotation of the third axis. Therefore, the device can improve the estimation accuracy of the rotational velocity component of the axial rotation of the third axis compared to a case where the rotational velocity components of two or three axial rotations are estimated at a time.

According to still another aspect of the present disclosure, there is provided an image processing device configured to calculate an arrival time until the imaging unit moving in an optical axis direction arrives at an imaging target, based on an image obtained by the imaging unit. The device includes: a rotation estimation unit configured to estimate a rotational velocity component relating to at least one axis of a movement of the imaging unit itself; and an arrival time calculation unit configured to calculate an arrival time in which the rotational velocity component relating to at least one axis is compensated, based on the rotational velocity component estimated by the rotation estimation unit, a constraint condition assuming that a brightness value of the imaging target does not change due to a relative movement between the imaging unit and the imaging target, and a relationship between the movement of the imaging unit and the motion vector of each pixel on the image.

In a case of the imaging unit that is mounted on the vehicle and moves in the optical axis direction, such as a camera that monitors the front, the main movement of the imaging unit is the translational movement component of the traveling direction. However, the movement of the imaging unit also includes the rotational movement component such as the pitch angle velocity due to the unevenness of the road surface and the yaw angle velocity due to turning. Therefore, when the arrival time is calculated using only the translational movement component, the accuracy of the calculated arrival time may deteriorate. On the other hand, in the image processing device according to still another aspect, the rotational velocity component relating to at least one axis of the movement of the imaging unit itself is estimated. The arrival time in which the rotational velocity component relating to at least one axis is compensated is calculated based on the estimated rotational velocity component, the constraint condition assuming that the brightness value of the imaging target does not change due to the relative movement of the imaging unit and the imaging target, and the relation between the motion of the imaging unit and the motion vector of each pixel on the image. As described above, since the arrival time in which the rotational velocity component is compensated is estimated, the device can estimate the arrival (collision) time with high accuracy even when the imaging unit vibrates up and down or makes the turning movement. In addition, since the arrival time is directly calculated without estimating the motion vector, the device can realize the estimation of the arrival time with a simple configuration.

According to still another aspect of the present disclosure, there is provided an image processing device configured to calculate a motion vector in which a motion of an imaging unit moving in an optical axis direction is compensated based on an image obtained by the imaging unit. The device includes: a rotation estimation unit configured to estimate a rotational velocity component relating to at least one axis of a movement of the imaging unit itself, a normalized translational velocity estimation unit configured to estimate a translational velocity that is normalized by a distance relating to at least one axis, based on the rotational velocity component estimated by the rotation estimation unit, a constraint condition assuming that a brightness value of the imaging target does not change due to a relative movement between the imaging unit and the imaging target, and a relationship between the movement of the imaging unit and the motion vector of each pixel on the image, and an unusual motion vector calculation unit configured to calculate a motion vector excluding a motion of a pixel caused by a motion of the imaging unit, based on the rotational velocity component estimated by the rotation estimation unit, the translational velocity estimated by the normalized translational velocity estimation unit, a constraint condition assuming that a brightness value of the imaging target does not change due to a relative movement between the imaging unit and the imaging target, and a relationship between the movement of the imaging unit and the motion vector of each pixel on the image.

Assuming that the imaging target is a rigid body, the motion vector (optical flow) on the image can be defined based on the relative rotational movement between the imaging unit and the imaging target, the distance normalized relative translational movement between the imaging unit and the imaging target, and the coordinates of each pixel. The distance normalized relative translational movement is a value obtained by dividing the relative translational velocity between the imaging unit and the imaging target by the distance from the point in the imaging target corresponding to each pixel to the imaging unit. Therefore, when the imaging unit is moving and the imaging target is stationary, the motion vector can be defined based on the rotational movement of the imaging unit and velocity of the distance normalized relative translational movement of the imaging unit. On the other hand, when the imaging target includes a moving object, a motion vector is observed, in which the component of the motion of the imaging target is added to the defined motion vector. The device calculates a motion vector in which motion of the pixel due to the motion of the imaging unit is excluded, based on the relationship between motion of the imaging unit and the motion vector of each pixel on the image. Therefore, only the motion vector caused by the motion of the imaging target, that is, the motion vector of the imaging target that is moving can be extracted.

According to another aspect of the present disclosure, there is provided an image processing device configured to set a reference point in a second image obtained by an imaging unit using a specific point in a first image obtained by a fixed imaging unit. The device includes: a storage unit; a motion vector calculation unit configured to calculate a motion vector based on the first image; an area setting unit configured to set an area having a uniform motion vector in the first image based on the motion vector calculated by the motion vector calculation unit; an initial setting unit configured to store a position of the point included in the area in the storage unit as the initial position of the specific point in association with an image feature of a surrounding area of the specific point; a search unit configured to search for a corresponding point of the specific point in the second image based on the image feature stored in the storage unit; and an output unit configured to output the position of the corresponding point in the second image as a position of a reference point in the second image.

In the image processing device according to still another aspect, the motion vector is calculated based on the first image obtained by the fixed imaging unit, and the area having the uniform motion vector is set in the first image. The position of the point included in the area having uniform motion vector set as the initial position of the specific point. The position of the specific point is stored in association with the image features of the surrounding area of the specific point. Using this specific point, the first image and the second image are associated with each other. The corresponding point in the second image corresponding to the specific point in the first image is searched based on the image features of the surrounding area of the specific point. The searched corresponding point is the reference point in the second image. The reference point is a reference position when associating the first image with the second image, and for example, is a reference position in the relative position coordinates in the second image. When the feature amount is small and the motion vector is small, it becomes difficult to associate the first image with the second image. According to the device, even if the feature amount is small, it is possible to associate the recognition targets in each image with each other by setting the reference point in the second image using a point included in the area having a uniform motion vector.

According to various aspects and embodiments of the present disclosure, there is provided an image processing device that can associates the recognition targets in each image with each other, even when there is a motion in the imaging unit.

DETAILED DESCRIPTION

Hereinafter, exemplary embodiments will be described with reference to the drawings. In the descriptions below, the same reference signs will be given to the same or equivalent elements, and duplicate descriptions thereof will not be repeated.

First Embodiment

Configuration of Image Processing Device

Figure 1:
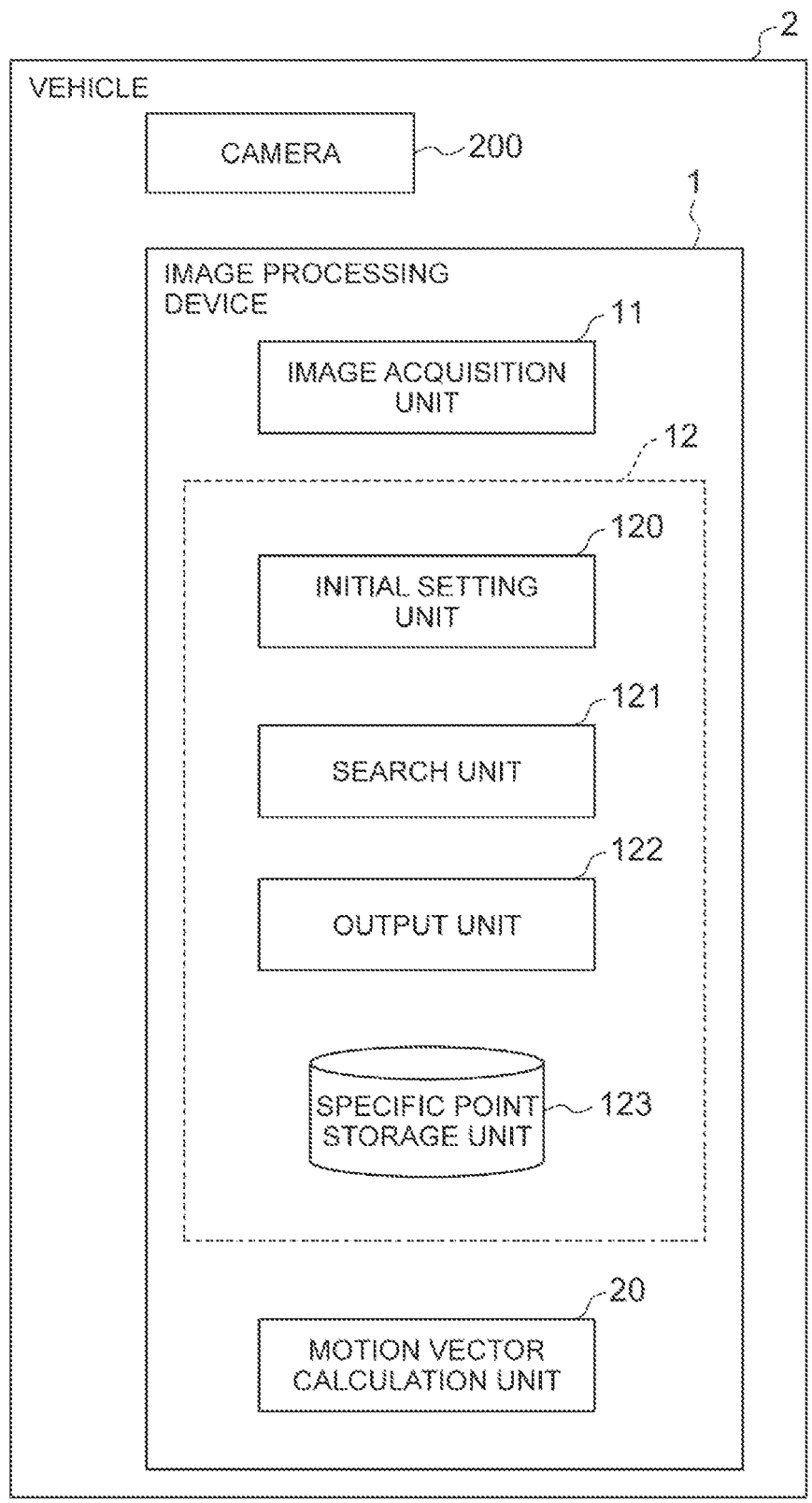
FIG. 1 is a functional block diagram of a vehicle including an image processing device in a first embodiment.

FIG. 1 is a functional block diagram of a vehicle including an image processing device in a first embodiment. As illustrated in FIG. 1, an image processing device 1 is mounted on a vehicle 2. The vehicle 2 includes a camera 200 (an example of an imaging unit). The camera 200 looks forward in the traveling direction of the vehicle 2. Therefore, an imaging direction (an optical axis direction) of the camera 200 substantially coincides with the traveling direction of the vehicle 2. In other words, the camera 200 is an imaging unit that moves approximately in the optical axis direction. The camera 200 is calibrated such that a pinhole camera model can be adapted. That is, internal parameters of the camera 200 are already well-known and the lens distortion is also corrected. The present disclosure discloses a practical technical idea to appropriately reduce the influence of movement of the imaging unit, and implies an effect of correcting the deviation between the traveling direction of the vehicle and the optical axis direction as a matter of course. Therefore, the present disclosure does not require an exact match between the two directions. Hereinafter, "moving in the optical axis direction" means "substantially moving in the optical axis direction".

An example of the camera 200 is a time correlation image sensor (correlation image sensor (CIS)). The CIS is an image sensor that outputs the time correlation between a light intensity signal of each pixel and a reference signal common to all pixels. According to the CIS, by using a sine wave signal as the reference signal, an output corresponding to the Fourier transform of the frequency of the sine wave signal can be obtained. The CIS outputs an intensity image $g_0$ that can be acquired by a general image sensor, and outputs a time correlation between the intensity signal of each pixel and the reference signal common to all the pixels as a correlation image $g_1$. The correlation image $g_1$ expresses two correlation images with respect to the reference signal, of which phases are different from each other by 90°, as a complex number having a real part and an imaginary part. The camera 200 may generate images (frames) configuring a moving picture. In this case, the camera 200 outputs images at a predetermined time interval. In the following description, an example in which the camera 200 a CIS camera is described, but the camera 200 may be a general image sensor camera that outputs only the intensity image.

The image processing device 1 is a device that is configured to be capable of communicating with the camera 200 and performs image processing on the image obtained by the camera 200. The image processing device 1, that is, an ECU is an electronic control unit including a calculation unit such as a central processing unit (CPU), a storage unit such as a read only memory (ROM) and a random access memory (RAM), and a communication unit such as controller area network (CAN). The ECU is connected to a network that communicates, for example, using a CAN communication circuit. The ECU, for example, realizes various functions of configuration elements of the image processing device 1 described below by inputting and outputting data by operating the CAN communication circuit based on, for example, a signal output from the CPU, recording the data in the RAM, loading the program recorded in the ROM into the RAM, and executing the program loaded in the RAM. The ECU may be configured with a plurality of electronic units.

The image processing device 1 sets a reference point on the image obtained by the camera 200 moving in the optical axis direction. The image on which the reference point is to be set may be the intensity image or the correlation image. The reference point is a reference position (a coordinate point) when associating images obtained by the camera 200 with each other. The reference point can be any of the reference point among an association between a first intensity image and a second intensity image, an association between a first correlation image and a second correlation image, and an association between a first intensity image and a second correlation image. Hereinafter, any image obtained by the camera 200 is referred to as a first image, and any image obtained by the camera 200 that is different from the first image will be referred to as a second image.

The image processing device 1 includes an image acquisition unit 11, a specific point management unit 12, and a motion vector calculation unit 20. The image processing device 1 does not necessarily need to include the motion vector calculation unit 20.

The image acquisition unit 11 acquires an image from the camera 200. The image acquisition unit 11 acquires the image obtained by the camera 200 via, for example, a network. The image acquisition unit 11 acquires a frame of a moving picture at each time as an example.

The specific point management unit 12 includes an initial setting unit 120, a search unit 121, an output unit 122, and a specific point storage unit 123 (an example of a storage unit).

The initial setting unit 120 stores a position of an optical axis neighborhood point in the first image obtained by the camera 200 into the specific point storage unit 123 as an initial position of a specific point in the first image, in association with image features of a surrounding area of the optical axis neighborhood point. The optical axis neighborhood point is a point on an imaging plane of the camera 200, which is positioned around an intersection of the optical axis of the camera 200 and the imaging plane of the camera 200. The optical axis neighborhood point may be the intersection of the optical axis of the camera 200 and the imaging plane. The initial setting unit 120 obtains the optical axis neighborhood point based on the first image, and stores the optical axis neighborhood point in the specific point storage unit 123 as the initial position of the specific point in the first image. The specific point is a coordinate point for determining a reference point. The initial setting unit 120 acquires the image features of the surrounding area of the optical axis neighborhood point based on the first image. The surrounding area is an area having a predetermined size including the optical axis neighborhood point, and the image features are intensity images and may be feature amounts of edges and corners or the like extracted from the intensity images. The initial setting unit 120 stores the optical axis neighborhood point in the specific point storage unit 123 while associating the position of the acquired optical axis neighborhood point on the image with the image features. To associate refers to defining a coordinate range of the image features such that the image features are specified when the position of the optical axis neighborhood point on the image is specified.

The movement of the camera 200 can be divided into translational three components and rotational three components (pitch angle, yaw angle, and rolling angle). A coordinate variation of the image caused by the variations of the pitch angle and yaw angle among the rotational three components, that is, a motion vector (optical flow) becomes uniform on the image regardless of a distance between the camera 200 and the imaging target. The size of the motion vector on the image caused by the rolling angle variation of the camera 200 differs depending on the position on the image, and depends on the distance from a rotation center of the rolling angle. On the other hand, the motion vector on the image caused by the translational movement of the camera 200 depends on the distance between camera 200 and the imaging target, and is larger at a nearer distance and is small as can be ignored at a sufficiently long distance. The optical axis neighborhood on the image obtained by the camera 200 moving in the optical axis direction can be considered to be at the sufficiently long distance if there is no obstacle. Therefore, at the optical axis neighborhood, the motion vector caused by the rolling angle variation and the translational movement can be regarded as sufficiently small. By setting the optical axis neighborhood point as the specific point, the initial setting unit 120 can the coordinate points correspond to other, of which the influences of motion vectors caused by the rolling angle variation and translational movement are small.

The initial setting unit 120 may select a point having the largest amount of information on the image features (spatial information amount) to be associated among the candidates of the optical axis neighborhood point, as an initial position of the specific point. In this case, certainty and processing stability of searching for the corresponding points in the search unit 121 are improved. As an example, the initial setting unit 120 sets the coordinates $(x_0, y_0)$ of the optical axis center at the initial time point as a candidate for specific point coordinates. Then, an integral value of edge intensity around the coordinates $(x_0, y_0)$ of the candidate of the specific point coordinates is calculated by following Formula.

$$\iint_\Sigma \left(\frac{\partial}{\partial x}g_0(x, y)\right)^2 + \left(\frac{\partial}{\partial y}g_0(x, y)\right)^2 dxdy \sum : [(x, y) | x_0 - a \le x \le x_0 - a, y_0 - a \le y \le y_0 - a]$$

When the integral value of edge intensity is equal to or greater than a predetermined threshold value, the initial setting unit 120 sets the coordinates $(x_0, y_0)$ as the specific point, and stores the result in the specific point storage unit 123 in association with the image features of the surrounding area. When the integral value of edge intensity is smaller than the predetermined threshold value, the initial setting unit 120 selects a point having the largest integral value of edge intensity, that is, the largest spatial information amount near the coordinates $(x_0, y_0)$ as a specific point, and stores that point in the specific point storage unit 123 in association with the image features of the surrounding area of that point.

When there is an area of a moving object such as a vehicle in the first image, the initial setting unit 120 may set the specific point outside that area. In this case, the specific point management unit 12 includes a moving object area detection unit that detects the moving object area. The method of detecting the moving object area is not particularly limited. As an example, the moving object area detection unit can use a labeling method such as Semantic segmentation or a pattern recognition method such as a single shot multibox detector (SSD). In the Semantic segmentation, a label is given to each pixel (x, y) to indicate whether the pixel represents a moving object or not using an intensity image $g_0(x, y, t)$. In the pattern recognition method such as the SSD, the moving object is detected as a rectangle. The moving object area detection unit does not need to give the label to each pixel to indicate whether the pixel represents a moving object or not, but may hold only the coordinates of the left, right, upper and lower ends of the rectangle. In this way, the memory can be used efficiently. When a moving object area is detected by the moving object area detection unit, the initial setting unit 120 selects a candidate of the optical axis neighborhood point existing outside the moving object area as the initial position of the specific point. In this way, in the search unit 121, it is possible to eliminate the motion component on the captured image caused by the movement of the moving object and obtain the corresponding point. The initial setting unit 120 may exclude the image features relating to the moving object area in advance from the image features stored in association with the specific point.

The search unit 121 searches for the corresponding point of the specific point in the second image obtained by the camera 200 based on the image features of the surrounding area of the specific point stored in the specific point storage unit 123. Specifically, the search unit 121 obtains $(x_c(t), y_c(t))$ which is a position (coordinates) of the specific point at the time point t at which the second image corresponding to the position of the specific point stored in the specific point storage unit is imaged. As an example, the search unit 121 uses the image features of the surrounding area of the specific point as a template, and searches for the corresponding points by template matching.

The search unit 121 may search for the corresponding points excluding the image features included in the moving object area among the image features of the surrounding area of the specific point stored in the specific point storage unit 123. For example, when an intensity image is associated with the specific point as the image features, the search unit 121 searches for the corresponding point using the intensity image in which the moving object area is excluded. In this case, the specific point management unit 12 includes the moving object area detection unit described above. When a moving object area is detected by the moving object area detection unit, the search unit 121 searches for the corresponding point using the intensity image excluding the moving object area.

The output unit 122 outputs a position of the corresponding point in the second image as a position of the reference point in the second image. The output unit 122 may output the reference point in the second image to the storage unit of the image processing device 1, or may output the reference point in the second image to another configuration element. The output reference point is used to associate the recognition targets in each image with each other, or is used to compensate the motion of the camera 200. The difference between the coordinates of the output reference point and the coordinates of the stored specific point is a component caused by the variations of the pitch angle and the yaw angle in the motion vector from the time when the specific point is stored to time of acquiring the second image.

The initial setting unit 120 may initialize the specific point stored in the specific point storage unit 123 when a predetermined condition is satisfied. For example, when the corresponding point in the second image deviates from the range of the optical axis neighborhood point in the second image, the initial setting unit 120 stores the optical axis neighborhood point in the second image in the specific point storage unit 123 in association with the image features of the surrounding area of that optical axis neighborhood point. In this case, for example, when the vehicle 2 mounted with the camera 200 moves along a curved road, even if the specific point deviates from the optical axis neighborhood, the corresponding point can be set continuously.

The specific point management unit 12 may include an update unit that updates the specific point stored in the specific point storage unit 123 when a predetermined condition is satisfied. As an example, the update unit stores the corresponding point of a second frame in the specific point storage unit 123 in association with the image features of the area around that corresponding point. In this case, even when the image features around the specific point change from that of the initial value setting time of the specific point, it is possible to reliably obtain the corresponding point in a third frame. The update unit may update the specific point on a frame-by-frame basis, or may update the specific point on a frame-by-frame basis while not updating the specific point in a specific frame.

The specific point management unit 12 may include an accumulated image generation unit that performs coordinate transformation (position matching) based on the reference point for each frame, and stores an accumulated image in which brightness values from the past to the previous frame are accumulated, in the storage unit. The accumulated image is an image in which the motion of the camera 200 is compensated. The update unit described above updates the specific point storage unit 123 while associating the position of the specific point with the accumulated image of the surrounding area. In the accumulated image, the information for the longer time relating to the image features of the surrounding area of the specific point is reflected. That is, even if a specific point is instantaneously shaded by a moving object on the intensity image at a certain time point, it is possible to obtain the image features relating to the specific point in a situation not shaded by the moving object on the intensity image at another time point. Therefore, it is possible to temporally stably obtain the corresponding point.

For example, when a distance between the corresponding point obtained in the search unit 121 and the optical axis center coordinates is shorter than a predetermined threshold value, the accumulated image generation unit generates the accumulated image by calculating a weighted sum of the intensity image $g_0$ (x, y) at the current time point and the accumulated image $g_{acc}$ (x, y, t−1) up to previous one time point. Here, the intensity image $g_0$ (x, y) is a result of coordinate transformation such that the specific point of the current time point, that is, the reference point becomes the origin, and the accumulated image $g_{acc}$ (x, y, t−1) is a result of coordinate transformation such that the specific point coordinates up to previous one time point becomes the origin. The weighted sum is calculated as follows.

$$g_{acc}(x,y,t) = w \cdot g_0(x,y) + (1-w) \cdot g_{acc}(x,y,t-1)$$

Here, w (0<w<1) is the weight of the intensity image $g_0$ in the weighted average. Since the coordinate system is transformed is to a coordinate system in which the specific point coordinates become the origin, the positional displacement caused by the rotational movement of the camera 200 is corrected, and the origin of the accumulated image generated up to the current time point also corresponds to the specific point. The generated accumulated image is stored in the specific point storage unit 123 together with the coordinates of the specific point obtained by the search unit 121.

The motion vector calculation unit 20 calculates a relative motion vector between the pixel and the reference point for each pixel of the second image. The relative motion vector is a vector that describes the motion relative to the reference point. The motion vector calculation unit 20 may calculate the motion vector (the optical flow) for each pixel, and then, may calculate the relative motion vector relative to the reference point, however, by calculating the motion vector with the reference point as the origin, it is possible to reduce the calculation amount while obtaining high accuracy calculating the relative motion vector. By calculating the relative motion vector based on the reference point, it is possible to obtain a motion vector in which the rotational movement of the camera 200 is compensated.

The optical flow (v=[vx, vy]T) is calculated under an "assumption that the brightness value of the imaging target does not change by the relative movement between the camera 200 and the imaging target". When the intensity at the position (x, y) at the time point t is described as f(x, y, t), a constraint condition representing this assumption is expressed as following equation (1).

$$f_x v_x + f_y v_y + f_t = 0 \left( f_x = \frac{\partial f}{\partial x}, f_y = \frac{\partial f}{\partial y}, f_t = \frac{\partial f}{\partial t} \right) \quad (1)$$

Equation (1) is the constraint condition when the camera 200 is a general image sensor camera.

When the camera 200 a CIS camera, the above-described constraint condition is expressed as Equation (2) below.

$$v \cdot \nabla(g_1 - g_0) + j\Delta_\omega g_1 = 0 \quad (2)$$

Here, j represents an imaginary number unit, and the image $g_1$(x, y) is expressed as follows.

$$g_1(x, y) = \int_0^\tau f(x, y, t) e^{-j\Delta_\omega t} dt \left( \Delta_\omega = \frac{2\pi}{\tau} \right) \quad (3)$$

When Equation (2) is transformed using Equation (4) below, Equation (5) is obtained.

$$h = \begin{bmatrix} h_x \\ h_y \end{bmatrix} = \begin{bmatrix} \frac{\partial}{\partial x}(g_1 - g_0) \\ \frac{\partial}{\partial y}(g_1 - g_0) \end{bmatrix}, b = j\Delta_\omega g_1 \quad (4)$$

$$h_x v_x + h_y v_y + b = 0 \quad (5)$$

In Equation (4), h is a spatial partial differential image in the x and y directions of the intensity image $g_0$ and the correlation image $g_1$ input from the CIS. Equation (5) is the constraint condition when the camera 200 a CIS camera. In Equation (5), $h_x$, $h_y$ and b are coefficients of the complex number. The motion vector calculation unit 20 can obtain the optical flow by solving Equation (5). When the camera 200 a CIS camera, two constraint equations corresponding to the real part and the imaginary part of Equation (5) can be obtained from an output signal of one pixel. Therefore, it is possible to calculate the optical flow having two unknowns, from the output signal of one pixel. On the other hand, when the camera 200 is a general image sensor camera, the optical flow can be obtained by solving Equation (1). Equation (1) is a real number equation, and thus, one constraint equation is obtained from the output signal of one pixel. Since the number of equations is smaller than the number of unknown, the optical flow cannot be calculated from the output signal of one pixel. Under the assumption that the optical flow is uniform in the neighborhood pixels, the number of equations can be increased using the output signal of the neighborhood pixels. In addition, $f_t$ in Equation (1) represents a time derivative, and the value of $f_t$ is obtained from the difference between two consecutive frame images. By using the assumption that the optical flow is uniform in the neighborhood pixels, and using the difference between the two consecutive frame images, even when the camera 200 is a common image sensor, it is possible to obtain the optical flow.

As a calculation of the spatial partial differential image in Equation (4), the motion vector calculation unit 20 performs the partial differentiation after calculating $g_1$-$g_0$. When the spatial partial differential image of intensity image is used in the next stage processing, the motion vector calculation unit 20 may perform the partial differential calculation independently on the intensity image $g_0$ and the correlation image $g_1$ and save the result such that the calculation result can be used in the next stage processing also. As an example, the motion vector calculation unit 20 performs the partial differential calculation by applying Sobel filters in the x direction and y direction as described below.

$$\frac{1}{8}\begin{bmatrix} -1 & 0 & 1 \\ -2 & 0 & 2 \\ -1 & 0 & 1 \end{bmatrix}, \frac{1}{8}\begin{bmatrix} -1 & -2 & -1 \\ 0 & 0 & 0 \\ 1 & 2 & 1 \end{bmatrix}$$

The motion vector calculation unit 20 may calculate the partial derivatives using the Fourier transform. Generally, when the Fourier transform of the function f(t) is F(ω), the Fourier transform of f'(t) which is a derivative of the function f(t) is jω(ω). Therefore, the motion vector calculation unit 20 can calculate the partial derivative by performing the Fourier transform, multiplying the result by j, and then, performing the inverse Fourier transform. When F and $F^{-1}$ are the operators of Fourier transform and inverse Fourier transform, respectively, the spatial partial derivative in the x direction of intensity image $g_0$ is expressed by following Equation.

$$\frac{\partial}{\partial x}g_0(x, y) = \mathcal{F}^{-1}\{j\omega_x \mathcal{F}\{g_0(x, y)\}\}$$

Operation of Image Processing Device

Figure 2:
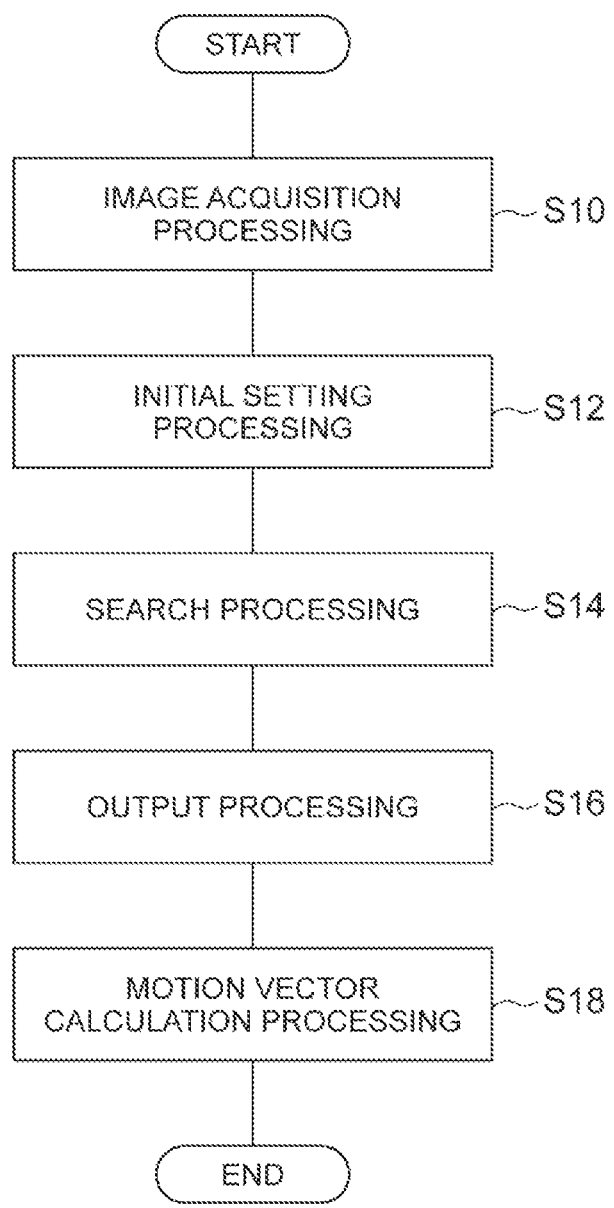
FIG. 2 is a flowchart illustrating an example of an operation by the image processing device in FIG. 1.

FIG. 2 is a flowchart illustrating an example of an operation by the image processing device 1. The processing in the flowchart illustrated in FIG. 2 starts, for example, when an instruction for starting the operation of the image processing device 1 is received. Hereinafter, it is assumed that the camera 200 outputs moving pictures.

As image acquisition processing (STEP S10), the image acquisition unit 11 acquires an image from the camera 200. The image acquisition unit 11 acquires a first frame as a first image which is a target to set a specific point. The image acquisition unit 11 acquires a second frame which is a target to set a reference point.

As initial setting processing (STEP S12), the initial setting unit 120 stores a position of the optical axis neighborhood point in the first frame acquired in the image acquisition processing (STEP S10) in the specific point storage unit 123 as the initial position of the specific point of first frame in association with the image features of the surrounding area of the optical axis neighborhood point.

As search processing (STEP S14), the search unit 121 searches for the corresponding point of the specific point in the second frame acquired in the image acquisition processing (STEP S10) based on the image features of the surrounding area of the specific point stored in the specific point storage unit 123.

As output processing (STEP S16), the output unit 122 outputs the position of the corresponding point of the second frame as a position of the reference point of the second frame. As an example, the output unit 122 outputs the reference point of the second frame to the storage unit of the image processing device 1 so that it can be referred to.

As motion vector calculation processing (STEP S18), the motion vector calculation unit 20 calculates a relative motion vector of between the pixel and the reference point for each pixel of the second frame. The motion vector calculation unit 20 calculates an optical flow from the second frame. The motion vector calculation unit 20 calculates the relative motion vector between each pixel and the reference point referring to the reference point of the second frame stored in the storage unit of image processing device 1.

When the motion vector calculation processing (STEP S18) ends, the flowchart illustrated in FIG. 2 ends. When processing the third frame subsequent to the second frame, the image acquisition unit 11 starts the flowchart illustrated in FIG. 2 from the beginning.

Summary of First Embodiment

The pitch angle and yaw angle of the camera 200 mounted on the vehicle 2 vary caused by unevenness of the road surface. Due to the variations of the pitch angle and yaw angle, the coordinates of the image by the camera 200 also vary. When recognizing the vehicle, the pedestrian, the signs, the signal, lane line from the image, the recognition accuracy can be improved by using information from a plurality of frames. In recognizing using the information from the plurality of frames, it is necessary to associate recognition targets between the frames. However, when there is a variation in the coordinates of the image as described above, there is a problem in the association cannot be performed or the recognition accuracy may deteriorate caused by an incorrect association.

In the image processing device 1, the position of the optical axis neighborhood point in the first image obtained by the camera 200 moving in the optical axis direction is set as the initial position of the specific point. The optical axis neighborhood point is a point where the motion vector caused by the variation of the rolling angle and the translational movement is small. The position of the optical axis neighborhood point is stored as a specific point in association with the image features of the surrounding area of the optical axis neighborhood point. Using this specific point, the first image and the second image are associated with each other. The corresponding point in the second image corresponding to the specific point in the first image is searched based on the image features of the surrounding area of the optical axis neighborhood point. The searched corresponding point is the reference point in the second image. The reference point is a reference position when associating the first image with the second image, and is a coordinate point on the image that compensates for coordinate transformation caused by the variations of the pitch angle and yaw angles. The reference point is, for example, a reference position of relative position coordinates in the second image. By expressing the coordinates of the recognition target as a relative position to the reference point, the correct association can be performed even if there is the coordinate variation, and the recognition accuracy using a plurality of frames can be improved.

Even if the camera 200 has a fast rotational movement component, the image processing device 1 can associate the recognition targets in each image with each other by setting the reference point in the second image using the optical axis neighborhood point in the first image. By generating the image of which the coordinate is transformed such that the reference point obtained for each frame has the same coordinates, the image processing device 1 can generate the image in which the coordinate variation caused by the variations of the pitch angle and yaw angle are compensated, that is, the image in which the image blurring is corrected. The image blur correction can be reflected in calculation (for example, calculation of the motion vector) without generating the image as long as the coordinate point of the reference point is known. In other words, setting reference point is equivalent to performing blur correction in terms of calculation.

Furthermore, the method of association by the image processing device 1 does not depend on the image at the time point at which the coordinate variation caused by the variations of the pitch angle and yaw angle of the camera 200 becomes a specific amount of displacement. Therefore, it is possible to correctly set the reference point at all time points of image capturing. In addition, the method of association by the image processing device 1 does not use the vanishing point as the reference point. Therefore, it is possible to correctly calculate the motion vector even when the vanishing point cannot be detected.

The difference between the output position of the reference point and the position of the specific point stored in the storage unit is a motion vector from the time the first image is captured to the time the second image is captured, and is caused by the variations of the pitch angle and yaw angle. Therefore, the image processing device 1 can compensate the coordinate variation caused by the variations of the pitch angle and yaw angle by calculating the relative motion vector, which is the relative motion between the pixel and the reference point.

Second Embodiment

An image processing device 1A according to a second embodiment is different from the image processing device 1 in a point that a rotational movement of the camera 200 is estimated. Hereinafter, the differences are mainly described, and the description same as that of the first embodiment will not be repeated.

Configuration of Image Processing Device

Figure 3:
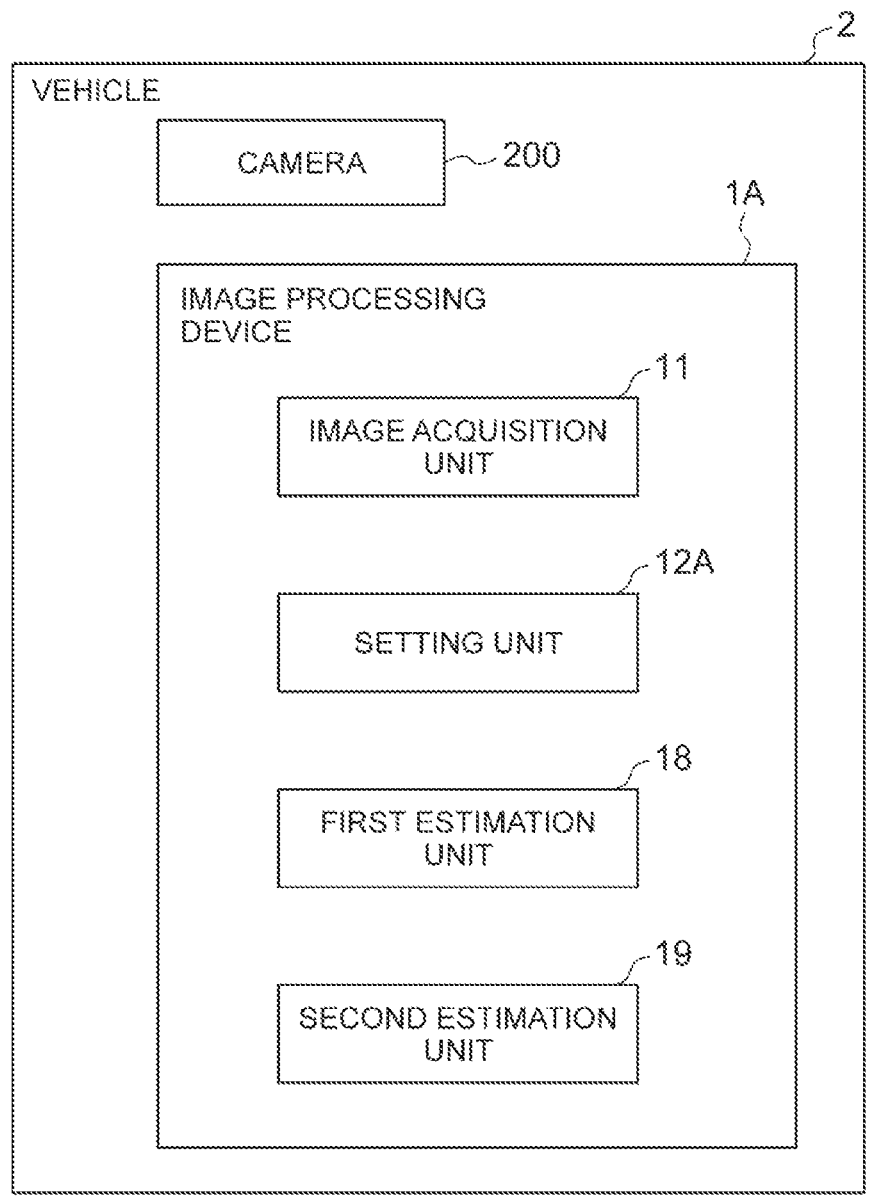
FIG. 3 is a functional block diagram of a vehicle including an image processing device in a second embodiment.

FIG. 3 is a functional block diagram of a vehicle including the image processing device in the second embodiment. As illustrated in FIG. 3, an image processing device 1A is mounted on the vehicle 2. The vehicle 2 includes a camera 200 and the image processing device 1A. The camera 200 is the same as that in the first embodiment.

The image processing device 1A includes an image acquisition unit 11, a setting unit 12A, a first estimation unit 18, and a second estimation unit 19. The image acquisition unit 11 is the same as that in the first embodiment.

The setting unit 12A has a function same as the specific point setting function of the initial setting unit 120 in the first embodiment. That is, the setting unit 12A has a function of setting the optical axis neighborhood point as the specific point. The setting unit 12A may have all the functions of the initial setting unit 120 as well as the function of setting the optical axis neighborhood point as the specific point. The setting unit 12A may be the same as the specific point management unit 12.

The first estimation unit 18 estimates a rotational velocity component of axis rotation of at least one axis among a pitch axis (an example of a first axis) and a yaw axis (an example of a second axis) parallel to the imaging plane of the camera 200 and orthogonal to each other among the rotational velocity component, based on the motion vector in the surrounding area of the specific point. The camera 200 mounted on the vehicle 2 and monitoring the front direction moves to the optical axis direction. The optical axis neighborhood in the image obtained by the camera 200 can be considered to be sufficiently long distance when there are no obstacles. In the sufficiently long distance, the motion vector caused by the translational movement of the camera 200 is negligibly small, and in the neighborhood of the specific point, the motion vector of the axial rotation caused by the rotational movement of a roll axis (an example of a third axis), which is a straight line connecting the specific point and the optical center (center of image) of the camera 200, becomes small. Therefore, the motion vector of the specific point at the optical axis neighborhood in the surrounding area can be considered as only the component of the axial rotation caused by the rotational movement of the pitch axis and the yaw axis. Therefore, the first estimation unit 18 can estimate the component of the axial rotation caused by the rotational movement of the pitch axis and the yaw axis by using the motion vector in the surrounding area of the specific point.

The second estimation unit 19 estimates the rotational velocity component of the axial rotation of the roll axis which is a straight line connecting the specific point and the optical center of the camera 200 based on the rotational velocity component estimated by the first estimation unit 18, the "constraint condition assuming that the brightness value of the imaging target does not change due to the relative movement between the camera 200 and the imaging target", and the "relationship between the movement of the camera 200 and the motion vector of each pixel on the image".

When the camera 200 a CIS camera, the "constraint condition assuming that the brightness value of the imaging target does not change due to the relative movement between the camera 200 and the imaging target" is expressed by Equation (2) or Equation (5) described in the first embodiment. When the camera 200 is a general image sensor camera, the constraint condition is expressed by Equation (1). Hereinafter, an outline of the relationship between the movement of the camera 200 and the motion vector of each pixel on the image will be described.

Figure 4:
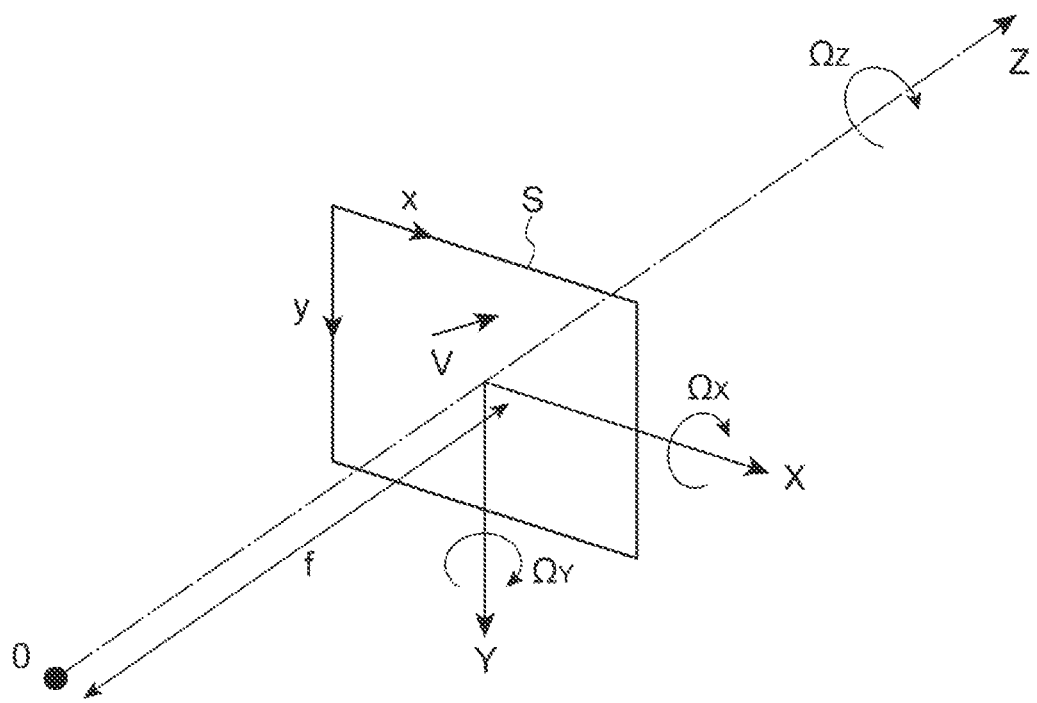
FIG. 4 is a diagram illustrating a definition of a camera coordinate system.

FIG. 4 is a diagram illustrating a definition of a camera coordinate system. As illustrated in FIG. 4, the optical center in an imaging optical system is set as the origin O in the coordinate system of the camera 200, and the optical axis is set as the Z axis. Axes orthogonal to the Z axis and orthogonal to each other are set as an X axis and a Y axis. The imaging plane is a plane represented by Z=fc. The fc is a focal length of the lens. The movement of the camera 200 is assumed to be defined using the translational movement parameters and rotational movement parameters for each of the X, Y, and Z coordinate axis. For example, the translational movement T is expressed by $T=(T_X, T_Y, Y_Z)$, and the rotational movement Ω is expressed by $\Omega=(\Omega_X, \Omega_Y, \Omega_Z)$. Here, the optical flow due to the motion (movement) of the camera 200 is expressed by the following Equation.

$$v = \begin{bmatrix} v_x \\ v_x \end{bmatrix} = \frac{1}{Z(x,y)} \begin{bmatrix} -f_c & 0 & x \\ 0 & -f_c & y \end{bmatrix} \begin{bmatrix} T_X \\ T_Y \\ T_Z \end{bmatrix} + \begin{bmatrix} \frac{xy}{f_c} & -\frac{f_c^2+x^2}{f_c} & y \\ \frac{f_c^2+y^2}{f_c} & -\frac{xy}{f_c} & -x \end{bmatrix} \begin{bmatrix} \Omega_X \\ \Omega_Y \\ \Omega_Z \end{bmatrix} \quad (6)$$

By defining the matrix components A and B as follows, Equation (6) can be expressed as briefly as Equation (7).

$$A = \begin{bmatrix} -f_c & 0 & x \\ 0 & -f_c & y \end{bmatrix}, B = \begin{bmatrix} \frac{xy}{f_c} & -\frac{f_c^2+x^2}{f_c} & y \\ \frac{f_c^2+y^2}{f_c} & -\frac{xy}{f_c} & -x \end{bmatrix} \quad (7)$$

$$v = \begin{bmatrix} v_x \\ v_x \end{bmatrix} = \frac{1}{Z(x,y)} AT + B\Omega$$

In Equation (7), the distance Z (x, y) is the distance to the object point corresponding to each pixel. The first term of Equation (7) is a component caused by the translational movement of camera 200, and the second term of Equation (7) is a component caused by the rotational movement of camera 200. Equation (6) or Equation (7) described above indicates the "relationship between the movement of the camera 200 and the motion vector of each pixel on the image".

The following Equation (8) can be obtained by substituting the equation (7) into Equation (2) which is a constraint condition when the camera 200 a CIS camera.

$$\left( \frac{1}{Z(x,y)} AT + B\Omega \right) \cdot \nabla(g_1 - g_0) + jn\Delta_\omega g_1 = 0 \quad (8)$$

Equation (8) is a constraint condition associated with the distance Z, the translational movement T and the rotational movement Ω. That is, a solution can be obtained with the distances Z (x, y), translational movement ($T=(T_X, T_Y, Y_Z)$) and rotational movement ($\Omega=(\Omega_X, \Omega_Y, \Omega_Z)$) as the unknowns under the constraint condition in Equation (8). Obtaining the solution using Equation (8) is equivalent to obtain an unknowns based on the "constraint condition assuming that the brightness value of the imaging target does not change due to the relative movement between the camera 200 and the imaging target", and the "relationship between the movement of the camera 200 and the motion vector of each pixel on the image". That is, the second estimation unit 19 estimates the rotational velocity component of the axial rotation of the third axis which is a straight line connecting the specific point and the optical center of the camera 200 using Equation (8).

By the way, the distance Z (x, y) is a value that differs for each pixel. The translational movement T and the rotational movement Ω are unknowns common to all the pixels. When the output signal of N pixels is obtained using CIS, as described above, 2N constraint equations are obtained. On the other hand, the number of unknowns is N+6. Because the number of equations needs to be greater than the number of unknowns, a condition 2N≥(N+6) needs to be satisfied. When the conditional expression is solved, in CIS, if the output signals of equal to or more than 6 pixels can be obtained, in principle, the solutions of unknowns can be obtained.

When applying to the vehicle 2, it is necessary to consider a specific property of vehicle movement. The translational velocity component $T_Z$ in the traveling direction of vehicle 2, that is, in the Z-axis direction is large, but the translational velocity components $T_X$ and $T_Y$ in the direction orthogonal to the traveling direction are small. The pitch angle velocity $\Omega_X$ due to the unevenness of the road surface and the yaw angle velocity $\Omega_Y$ due to the turning are relatively large, but rolling angle velocity $\Omega_Z$ is small. When trying to simultaneously obtain six unknowns including errors under the specific conditions of vehicle motion, a phenomenon occurs in which the solution is led by the large value component and the error of the small value component is increased, and thus, it becomes difficult to obtain the practical solutions at the same time.

As described above, when trying to obtain the solution from Equation (8) at once, there are problem of the number of unknowns and the problem of errors. On the contrary, after the rotational velocity components $\Omega_X$ and $\Omega_Y$ of the axial rotation of the pitch axis and yaw axis are estimated by the first estimation unit 18, the second estimation unit 19 estimates only the rotational velocity component of the axial rotation of the roll axis based on the rotational velocity component of the axial rotation of the pitch axis and yaw axis. Equation (8) is a non-linear equation with Z (x, y) as a denominator, it is possible to solve the equation with $T_X/Z(x, y)$, $T_Y/Z(x, y)$, and $T_Z/Z(x, y)$ as the unknowns. As described above, the second estimation unit 19 reduces the number of unknowns in Equation (8) and then estimates only the rotational velocity component of the rotation of the roll axis. Therefore, it is possible to improve the estimation accuracy without occurring the errors caused by other unknowns. For example, even if the rotational velocity component of the roll axis is larger than the rotational velocity component of the axial rotation of the pitch axis and yaw axis, it is possible to improve the estimation accuracy.

Hereinafter, details of estimation of the rotational velocity component of axial rotation of the pitch axis and yaw axis by first estimation unit 18, and details of the estimation of the rotational velocity component of axial rotation of the roll axis by the second estimation unit 19 will be described.

Details of Estimation by First Estimation Unit 18

The specific point is set to the optical axis neighborhood point in the image obtained from the camera 200 moving in the optical axis direction, and is continuously tracked. Therefore, it can be said that the specific point is always at the sufficiently long distance. In Equation (7), the first term of Equation (7) approaches 0 as the distance Z (x, y)

becomes sufficiently large relative to the translational velocity |T|. Therefore, Equation (7) can be approximated as following Equation (9).

$$v = \begin{bmatrix} v_x \\ v_x \end{bmatrix} \cong B\Omega \quad (9)$$

Here, when second order minute terms (terms including x2, y2, xy) are ignored in the elements of the matrix B, approximation can be made as in the following equation (10).

$$v = \Omega_z \begin{bmatrix} y \\ -x \end{bmatrix} + \begin{bmatrix} -f_c\Omega_y \\ f_c\Omega_x \end{bmatrix} \quad (10)$$

In Equation (10), the first term is the rolling angle velocity component, and the second term is the pitch angle velocity component and the yaw angle velocity component. In the camera 200 mounted on the traveling vehicle 2, the pitch angle velocity $\Omega_x$ due to the unevenness of the road surface and the yaw angle velocity $\Omega_y$ due to turning are relatively large, but the rolling angle velocity $\Omega_z$ is small. Furthermore, the rolling angle velocity component increases as departed from the origin in the image, and decreases near the origin. The origin, that is, since the reference point of the motion vector is at the optical axis neighborhood, that is, near the rotation center, the rolling angle velocity $\Omega_z$ can be ignored. Therefore, the main the motion vector in the surrounding area of the specific point are as follows.

$$v \cong \begin{bmatrix} -f_c\Omega_y \\ f_c\Omega_x \end{bmatrix} \quad (11)$$

The surrounding area of the specific point is defined as a rectangular area having a width We and a height HI centered on the coordinates $(x_e, y_c)$ of the specific point. In order to exclude the imaging target at a short distance from the surrounding area of the specific point, the surrounding area of the specific point may be set slightly above the specific point (in the negative direction of the y coordinate). The main motion vector in the surrounding area of the specific point can be extracted as the coordinate of the peak of a histogram value by creating the histogram of the optical flow. In creating the histogram, the pixels with the moving object label described in the first embodiment are excluded.

As described above, the first estimation unit 18 may estimate the main motion vector in the surrounding area of the specific point at the optical axis neighborhood as a rotational velocity component of the axial rotation of at least one of the yaw axis and the pitch axis. Even if an error occurs in the optical flow for each pixel, by estimating the main motion vector from the histogram of the optical flow, it is possible to estimate the rolling angle velocity stably with high accuracy. The optical flow can be calculated by the method same as described in the first embodiment.

Details of Estimation by Second Estimation Unit 19

In Equation (6) which is the relationship between the motion of the camera 200 and the optical flow, when the second-order minute terms (terms including $x^2$, $y^2$, xy) are ignored, the equation can be described as following Equation (12).

$$v = \Omega_z \begin{bmatrix} y \\ -x \end{bmatrix} + \begin{bmatrix} -f_c\Omega_y \\ f_c\Omega_x \end{bmatrix} + \frac{T_z}{Z(r)}\begin{bmatrix} x \\ y \end{bmatrix} - \frac{f_c}{Z(r)}\begin{bmatrix} T_x \\ T_y \end{bmatrix} \quad (12)$$

When $v_r(r)$ which is the motion of the camera 200 is written as following equation (13), Equation (12) can be expressed as Equation (14).

$$v_r(r) = \frac{T_z}{Z(r)}, \quad v_{tx}(r) = \frac{T_x}{Z(r)}, \quad v_{ty}(r) = \frac{T_y}{Z(r)} \quad (13)$$

$$v = \Omega_z \begin{bmatrix} y \\ -x \end{bmatrix} + \begin{bmatrix} -f_c\Omega_y \\ f_c\Omega_x \end{bmatrix} + v_r(r)\begin{bmatrix} x \\ y \end{bmatrix} - f_c\begin{bmatrix} v_{tx}(r) \\ v_{ty}(r) \end{bmatrix} \quad (14)$$

When substituting Equation (14) into Equation (2) which is the constraint condition when the camera 200 a CIS camera, Equation (15) described below is obtained.

$$\left(\Omega_z\begin{bmatrix} y \\ -x \end{bmatrix} + \begin{bmatrix} -f_c\Omega_y \\ f_c\Omega_x \end{bmatrix} + v_r(r)\begin{bmatrix} x \\ y \end{bmatrix} - f\begin{bmatrix} v_{tx}(r) \\ v_{ty}(r) \end{bmatrix}\right) \cdot \nabla(g_1 - g_0) + \quad (15)$$

$$j\Delta_\omega g_1 = 0$$

The pitch angle velocity $\Omega_x$ and yaw angle velocity $\Omega_y$ are already estimated by the first estimation unit 18, and are known already. Therefore, the equation may be solved with four of $\Omega_z$, $v_r(r)$, $v_{tx}(r)$ and $v_{ty}(r)$ as unknowns. Since the translational movement of the camera 200 is almost only in the Z-axis direction, it can be approximated as Tx=Ty=0. Then, the unknowns can be reduced to two, $\Omega_z$ and $v_r(r)$, as in following Equation (16).

$$\left(\Omega_z\begin{bmatrix} y \\ -x \end{bmatrix} + \begin{bmatrix} -f_c\Omega_y \\ f_c\Omega_x \end{bmatrix} + v_r(r)\begin{bmatrix} x \\ y \end{bmatrix}\right) \cdot \nabla(g_1 - g_0) + j\Delta_\omega g_1 = 0 \quad (16)$$

The variables in Equation (16) is converted into following variables.

$$h_\theta = \begin{bmatrix} y \\ -x \end{bmatrix} \cdot \nabla(g_1 - g_0)$$

$$h_r = \begin{bmatrix} x \\ y \end{bmatrix} \cdot \nabla(g_1 - g_0)$$

$$h_b = \begin{bmatrix} -f_c\Omega_y \\ f_c\Omega_x \end{bmatrix} \cdot \nabla(g_1 - g_0) + j\Delta_\omega g_1$$

In this way, Equation (16) is expressed as following Equation (17).

$$\Omega_z h_\theta + v_r(r)h_r + h_b = 0 \quad (17)$$

Since the rolling angle velocity S is an unknown common to all the pixels, but $v_r(r)$ is an unknown different for each pixel, $\Omega_z$ and $v_r(r)$ are calculated for each for each pixel. Specifically, by minimizing an evaluation function described as following Equation (18) in the surrounding area (integral interval $\Gamma$) for each pixel, $\Omega_z$ and $v_r(r)$ are calculated. The integration interval $\Gamma$ is a local area that can be approximated $v_r(r)$ being equal, for example, an area of 3×3 pixels centered on the pixel of interest.

$$J = \int_\Gamma \|\Omega_z h_\theta + v_r(r)h_r + h_b\|^2 dr \quad (18)$$

Assuming that the values of partial derivatives of $\Omega_z$ and $v_r(r)$ are 0, following Equation (19) can be obtained as a solution.

$$\Omega_{zi} = \frac{\Re(h_{\theta i}^* h_{ri})\Re(h_{ri}^* h_{bi}) - \|h_{ri}\|^2 \Re(h_{\theta i}^* h_{bi})}{\|h_{\theta i}\|^2 \|h_{ri}\|^2 - \Re(h_{\theta i}^* h_{ri})^2} \tag{19}$$

Here, a suffix i is an index that specifies each pixel.

Ideally, the rolling angle velocity $\Omega_{zi}$ has the same value in all the pixels. However, actually, the rolling angle velocity $\Omega_{zi}$ is a value including an error. In order to reduce this error and to obtain a stable estimated value of the rolling angle $\Omega z$, the second estimation unit 19 estimates the rolling angle velocity $\Omega_z$ as a weighted average value as expressed in following Equation (20).

$$\Omega_z = \frac{\sum_i w_i \Omega_{zi}}{\sum_i w_i} = \frac{\sum_i \{\Re(h_{\theta i}^* h_{ri})\Re(h_{ri}^* h_{bi}) - \|h_{ri}\|^2 \Re(h_{\theta i}^* h_{bi})\}}{\sum_i \{\|h_{\theta i}\|^2 \|h_{ri}\|^2 - \Re(h_{\theta i}^* h_{ri})^2\}} \tag{20}$$

The weight $w_i$ of each pixel of weighted average is defined by the following Equation (21).

$$w_i = \|h_{\theta i}\|^2 \|h_{ri}\|^2 - \Re(h_{\theta i}^* h_{ri})^2 \tag{21}$$

Equation (21) is a denominator of Equation (19), that is, a determinant for finding the solution. Using this definition, it is possible to obtain an average value in which a large weight is given to a solution with a high degree of reliability.

When there is an area of moving object such as a vehicle in the image, at least one of the first estimation unit 18 and the second estimation unit 19 may estimate the rotational velocity component in the area excluding the area of the moving object. In this case, the image processing device 1A may include the moving object detection unit described in the first embodiment.

In this way, it is possible to estimate the rotational velocity component while excluding the motion component on the captured image caused by the movement of the moving object.

Furthermore, when there is an empty (sky) area in the image, at least one of the first estimation unit 18 and the second estimation unit 19 may estimate the rotational velocity component in the area excluding the empty area. In this case, the image processing device 1A includes an empty area detection unit. The empty area in the captured image has a small change (gradient) in both spatially and temporally, and sometimes the brightness value may be saturated, and thus, a significant motion vector cannot be obtained in practical use. Therefore, the first estimation unit 18 suppresses the estimation error of the rotational velocity component by detecting the empty area in advance and excluding the empty area from the motion vector calculation. In addition, a distance to the empty area is sufficiently long distance compared to the foreground of the imaging target. Therefore, the values of $T_x/Z$ (x, y), $T_y/Z$ (x, y) and $T_z/Z$ (x, y) become almost equal to zero. When both the coefficients and the solution are small in the simultaneous equation, it is an ill posed problem. In this case, the solution is indeterminate, which may cause a large error. For this reason, the second estimation unit 19 detects an empty area in advance and excludes the empty area from the calculation, or sets the solution to a fixed value such that the error due to the ill posed problem can be avoided.

The empty area detection unit gives a label indicating whether each pixel (x, y) is empty or not using the intensity image $g_0$ (x, y, t) and partial differential images $g_0x$ (x, y, t) and $g_0y$ (x, y, t) for each pixel in the x-direction and y-direction respectively. Since the optical axis of the camera 200 is set in the horizontal direction and y=0 is horizontal line, the area where the y coordinate is negative is the area that may be possibly the empty area. Considering the variation of the horizontal line due to the rotational movement of the camera 200 and the road slope or the like, y coordinate of horizontal line is defined as $y_h$. The empty area detection unit determines whether the area is the empty area or not according to the following criteria.

$$skylabel(x, y) = \begin{cases} \text{true}: \text{if } (y \leq y_h \text{ and } g_0 \geq sky_{imin} \text{ and} \\ \quad g_0 \leq sky_{imax} \text{ and } g_{0x}^2 + g_{0y}^2 \leq sky_{var}) \\ \text{false}: \text{else} \end{cases}$$

The determination condition of the label function described above means that the brightness value is in a predetermined range and the spatial variation is equal to or less than a predetermined threshold value. Here, the threshold value $sky_{imin}$, $sky_{imax}$, $sky_{var}$ are set calculated in advance follows using the intensity image $g_0(x, y, t)$ and the partial differential images $g_{0x}(x, y, t)$ and $g_{0y}(x, y, t)$.

First, the empty area detection unit generates a two-dimensional histogram in the area of y<=yh, with the horizontal axis as the brightness value and the vertical axis as the spatial slope $g_{0x}^2 + g_{0y}^2$, and obtains a peak coordinate $(p_i, p_j)$. The empty area determines unit defines a minimum brightness value, a maximum brightness value, and a maximum spatial slope value that are predetermined percentage of the peak value of the histogram value (for example, 10% of the peak value) as the $sky_{imin}$, $sky_{imax}$, and $sky_{var}$. Specifically, the empty area detection unit performs the search in the negative direction of the horizontal axis starting from the peak coordinate $(p_i, p_j)$, and defines the horizontal axis coordinate at which the histogram value falls equal to or lower than 10% of the peak value at first time as the $sky_{imin}$. Similarly, the empty area detection unit performs the search in the positive direction of the horizontal axis starting from the peak coordinate $(p_i, p_j)$, and defines the horizontal axis coordinate at which the histogram value falls equal to or lower than 10% of the peak value at first time as the $sky_{imax}$. Similarly for the vertical axis direction of the histogram, the empty area detection unit performs the search in the positive direction of the vertical axis starting from the peak coordinate $(p_i, p_j)$, and defines the vertical axis coordinate at which the histogram value falls equal to or lower than 10% of the peak value at first time as the $sky_{var}$.

The empty area detection unit detects the empty area using the brightness value and the spatial slope and determines whether or not the area is the empty area, but not limited thereto. The empty area detection unit may use a label giving method such as Semantic Segmentation. By estimating the rotational velocity component in the area excluding the empty area, the first estimation unit 18 can prevent the estimation accuracy of the rotational velocity component from deteriorating due to the saturation of the brightness value and the absence of the texture.

The image processing device 1A may not include the first estimation unit 18. In this case, the image processing device A includes the image acquisition unit 11, the setting unit 12A and the second estimation unit 19. The second estimation unit 19 estimates the rotational velocity component of the axial rotation of the roll axis which is a straight line connecting the specific point and the optical center of the camera 200, based on a "constraint condition assuming that the brightness value of imaging target does not change due to relative movement between the camera 200 and the imaging target", and a "relationship between the movement of the camera 200 and the motion vector of each pixel on the image".

Operation of Image Processing Device

Figure 5:
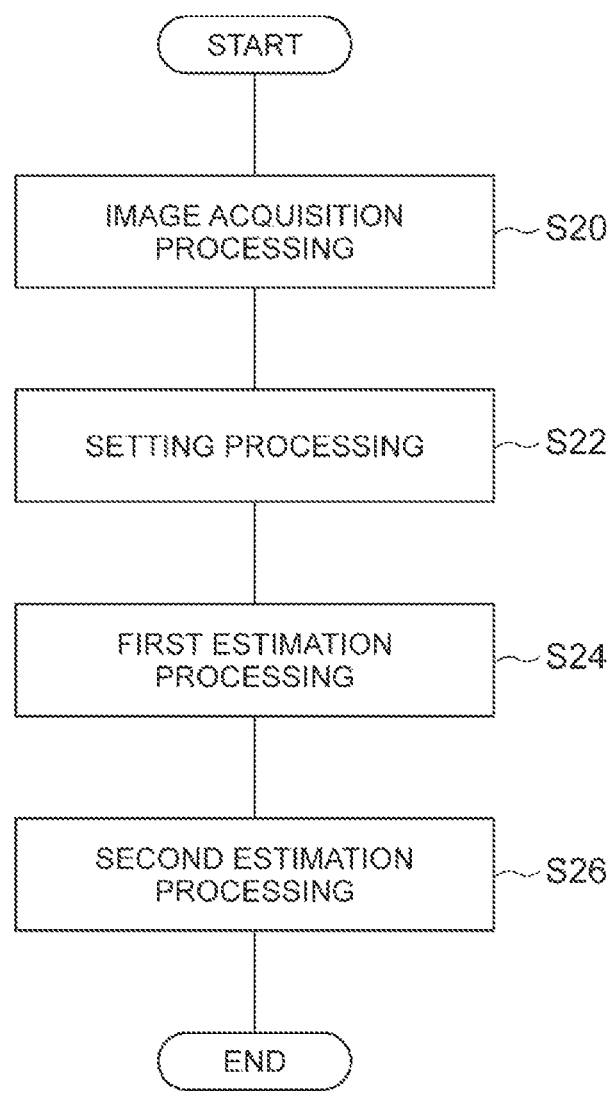
FIG. 5 is a flowchart illustrating an example of an operation by the image processing device in FIG. 3.

FIG. 5 is a flowchart illustrating an example of the operation of the image processing device 1A. The processing in the flowchart illustrated in FIG. 5 starts, for example, when an instruction for starting the operation of the image processing device 1A is received. Hereinafter, it is assumed that the camera 200 outputs moving pictures.

As image acquisition processing (STEP S20), the image acquisition unit 11 acquires an image from the camera 200. This process is the same as the image acquisition processing (STEP S10) in FIG. 2.

As setting processing (STEP S22), the setting unit 12A sets the position of the optical axis neighborhood point in the first frame acquired in image acquisition processing (STEP S20) as the specific point of the first frame.

As first estimation processing (STEP S24), the first estimation unit 18 estimates the rotational velocity component of the axial rotation of at least one of the pitch axis and the yaw axis based on the motion vector in the surrounding area of the specific point set in the setting processing (STEP S22). As an example, the first estimation unit 18 obtains a main motion vector from the histogram of the optical flow in the surrounding area of the specific point, and then, estimates the rotational velocity component of the axial rotation of the pitch axis and the yaw axis.

As second estimation processing (STEP S26), the second estimation unit 19 estimates the rotational velocity component of the axial rotation of the roll axis which is a straight line connecting the specific point and the optical center of the camera 200 based on the rotational velocity components estimated in the first estimation processing (STEP S24), the "constraint condition assuming that the brightness value of the imaging target does not change due to the relative movement between the camera 200 and the imaging target", and the "relationship between the movement of the camera 200 and the motion vector of each pixel on the image". As an example, the second estimation unit 19 solves Equation (17) derived based on the rotational velocity component of the axial rotation of the pitch axis and yaw axis and Equation (8), that is, obtains a solution expressed by Equation (19) by minimizing Equation (18).

When the second estimation processing (STEP S26) ends, the flowchart illustrated in FIG. 5 ends. When processing the third frame subsequent to the second frame, the image acquisition unit 11 starts the flowchart illustrated in FIG. 5 from the beginning.

Summary of Second Embodiment

In the image processing device 1A, the position of the optical axis neighborhood point in the first image obtained by the camera 200 moving in the optical axis direction is set as the position of the specific point. Then, the first estimation unit 18 estimates the rotational velocity component of axial rotation of at least one of the pitch axis and the yaw axis of the camera 200 among the rotational velocity components, based on the motion vector in the surrounding area of the specific point. By estimating the main motion vector in the surrounding area of the specific point of the optical axis neighborhood, even if there occurs in individual motion vector estimation, the image processing device 1A can estimate the rotational velocity component of the axial rotation of the pitch axis and the yaw axis with high accuracy and robustness as the main motion vector.

The second estimation unit 19 estimates the rotational velocity component of the axial rotation of the roll axis which is a straight line connecting the specific point and the optical center of the camera 200 based on the rotational velocity component estimated by first estimation unit 18, the constraint condition assuming that the brightness value of the imaging target does not change due to the relative movement of the imaging unit and the imaging target, and the relation between motion of the imaging unit and the motion vector of each pixel on the image. When the rotational velocity components of two or three axial rotations are estimated at a time, the equation for the estimation will have a plurality of unknowns. The rotational velocity component of the axial rotation of the roll axis has a considerably smaller value than the rotational velocity component of the pitch axis and the yaw axis. When a plurality of unknowns including a large value and a small value are simultaneously estimated, the estimation is driven by the large value component, and thus, the error of the small value component increases. The image processing device 1A divides the estimation into two, such as the estimation of the rotational velocity component of the axial rotation of at least one of the pitch axis and the yaw axis and the estimation of the rotational velocity component of the axial rotation of the roll axis. Therefore, this device can improve the estimation accuracy of the rotational velocity component of the axial rotation of the roll axis compared to a case where the rotational velocity components of two or three axial rotations are estimated at a time.

Because there is no restriction that the motion vector estimation has to be performed simultaneously at a plurality of points having a specific positional relationship, the first estimation unit 18 of the image processing device 1A can estimate the rotational velocity component even in an image having few textures. In addition, because there is no assumption or restriction on the translational velocity, the image processing device 1A can correctly estimate the rotational velocity component even if the translational velocity of the camera 200 changes, slows down, or stops.

In the image processing device 1A, since the roll axis is defined as a straight line connecting the specific point and the optical center of camera 200, even if the pitch angle and the yaw angle of the camera 200 vary, the direction of the roll axis can always be stabilized. The image processing device 1A can estimate the rotational velocity component of the axial rotation of the roll axis with high accuracy by stabilizing the direction of the roll axis.

Third Embodiment

An image processing device 1B according to a third embodiment is different from the image processing device 1 in a point that the rotational movement of the camera 200 is estimated and a point that an arrival time the camera 200 arrives at the imaging target is estimated. Hereinafter, the differences are mainly described, and the description same as that of the first embodiment and the second embodiment will not be repeated.

Configuration of Image Processing Device

Figure 6:
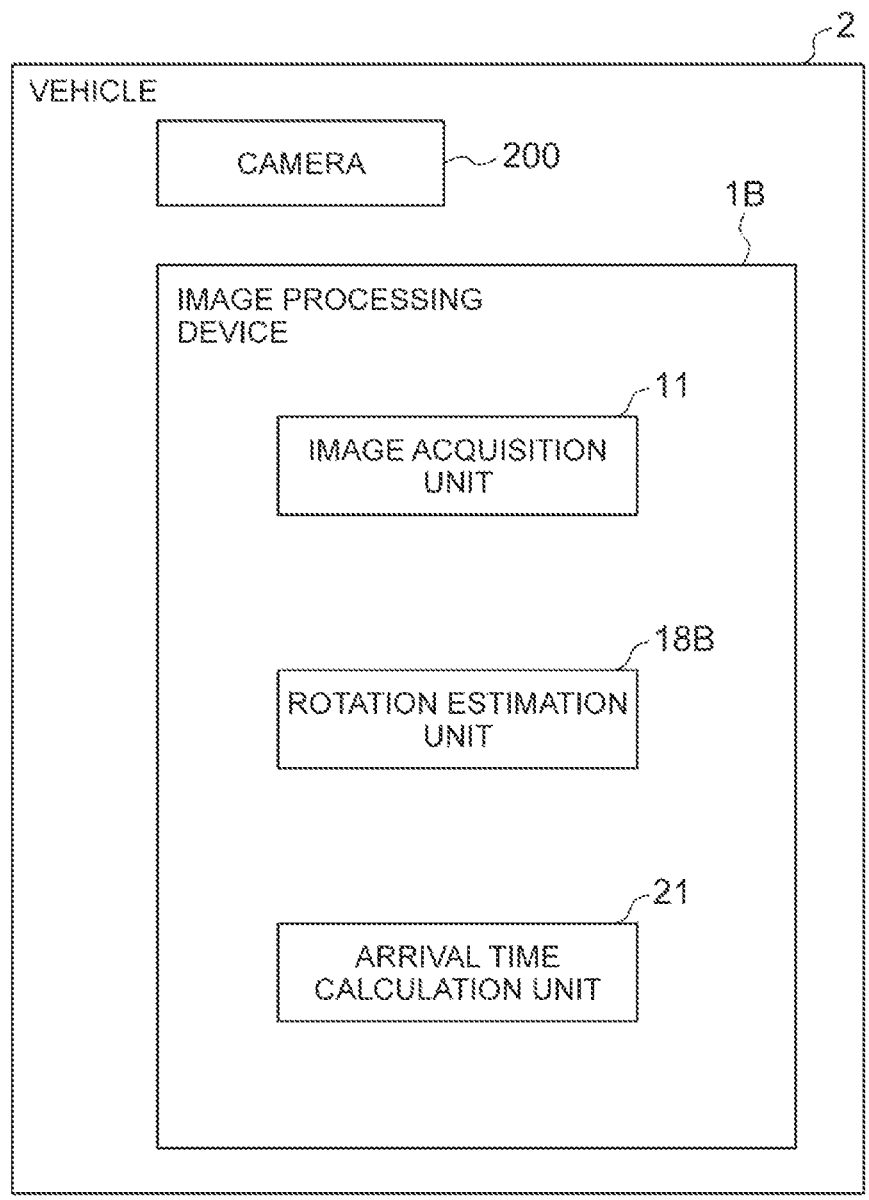
FIG. 6 is a functional block diagram of a vehicle including an image processing device in a third embodiment.

FIG. 6 is a functional block diagram of a vehicle including the image processing device in the third embodiment. As illustrated in FIG. 6, an image processing device 1B is mounted on the vehicle 2. The vehicle 2 includes a camera 200 and the image processing device 1B. The camera 200 is the same as that in the first embodiment.

The image processing device 1B includes an image acquisition unit 11, a rotation estimation unit 18B, and an arrival time calculation unit 21. The image acquisition unit 11 is the same as that in the first embodiment.

The rotation estimation unit 18B estimates a rotational velocity component relating to at least one axis of the movement of the camera 200 itself. The rotation estimation unit 18B may be the same as at least one of the first estimation unit 18 and the second estimation unit 19 in the second embodiment. In this way, the rotational movement component relating to at least one of the pitch axis, yaw axis, and roll axis is estimated.

The arrival time calculation unit 21 calculates the arrival time in which the rotational velocity component relating to at least one axis is compensated, based on the rotational velocity component estimated by the rotation estimation unit 18B, the "constraint condition assuming that the brightness value of the imaging target does not change due to the relative movement between the camera 200 and the imaging target" and the "relationship between the movement of the camera 200 and the motion vector of each pixel on the image".

The "constraint condition assuming that the brightness value of the imaging target does not change due to the relative movement between the camera 200 and the imaging target" is expressed by Equation (2) or Equation (5) in the first embodiment. The "relationship between the movement of the camera 200 and the motion vector of each pixel on the image" is expressed by Equation (6) or Equation (7) in the second embodiment.

Ignoring and approximating the second-order minute terms (terms including $x^2$, $y^2$, $xy$) of the equation (6), the third term of the equation (14) obtained by further deforming is as follows.

$$v_r(r)\begin{bmatrix} x \\ y \end{bmatrix}$$

The third term is a radially distributed velocity vector field centered on the coordinate origin. Since the coefficient of radial velocity vector field, $v_r(r) = T_Z/Z(r)$ can be regarded as a normalized translational velocity in which translational velocity component $T_Z$ is normalized by a distance $Z(r)$, the distance $Z(r)$ of the stationary object is given by the fact that the translational velocity component $T_Z$ is a known factor. Furthermore, the inverse number $1/v_r(r)$ is an amount obtained by diving the distance in the Z-axis direction by the translational velocity $T_Z$ in the Z-axis direction, and represents a time it takes for an imaging target point corresponding to the pixel $r$ to reach the camera 200, that is, an arrival time. Even if the imaging target is moving, the inverse number $1/v_r(r)$ represents the correct arrival time.

In the calculation of minimizing Equation (18), the arrival time calculation unit 21 can also estimate the normalized translational velocity $v_r(r)$ at the same time as estimating the rolling angle velocity $\Omega_{zi}$. Because an error is included in the rolling angle velocity $\Omega_{zi}$ estimated for each pixel, an error is also included in the normalized translational velocity $v_r(r)$ estimated at the same time. After estimating the rolling angle velocity $\Omega_z$ with high accuracy based on Equation (20), the arrival time calculation unit 21 can increase the estimation accuracy of the normalized translational velocity $v_r(r)$ by making the rolling angle velocity $\Omega_z$ known, and making only the normalized translational velocity $v_r(r)$ unknown number in Equation (16).

The variables of Equation (16) are converted as follows.

$$h_\theta = \begin{bmatrix} y \\ -x \end{bmatrix} \cdot \nabla(g_1 - g_0)$$

$$h_r = \begin{bmatrix} x \\ y \end{bmatrix} \cdot \nabla(g_1 - g_0)$$

$$h_b = \Omega_z h_\theta + \begin{bmatrix} -f_c \Omega_y \\ f_c \Omega_x \end{bmatrix} \cdot \nabla(g_1 - g_0) + j\Delta_\omega g_1$$

Accordingly, Equation (16) is expressed as follows.

$$v_r(r)h_r + h_b = 0 \qquad (22)$$

The arrival time calculation unit 21 calculates the normalized translational velocity $v_r(r)$ from Equation (22). In Equation (22), an evaluation function J is defined based on the same concept as the Lucas & Kanade method, and a solution is obtained by minimizing the evaluation function.

$$J = \int_r \|v_r(r)h_r + h_b\|^2 dr \qquad (23)$$

$$v_r(r) = -\frac{\sum \mathcal{R}(h_{bi}^* h_{ri})}{\sum \|h_{ri}\|^2}$$

The arrival time calculation unit 21 may define the evaluation function J in Equation (22) based on the same concept as the Horn & Schunck method and may minimize the evaluation function. The evaluation function and the solution in this case are as follows.

$$J = \int_r (v_r h_r + h_b)^2 dr + \lambda^2 \int_r |\nabla v_r|^2 dr \qquad (24)$$

$$v_r^{(k+1)} = \overline{v}_r^{(k)} - \frac{\|h_r\|^2 \overline{v}_r^{(k)} + \mathcal{R}(h_r^* h_b)}{(\lambda^2 + \|h_r\|^2)}$$

The arrival time calculation unit 21 calculates the arrival time $1/v_r(r)$ from the normalized translational velocity $v_r(r)$ calculated using the above-described methods.

Furthermore, when there is an area where an empty area (sky) is drawn in the image, the arrival time calculation unit 21 may calculate the arrival time in the area excluding the empty area. In this case, the image processing device 1B may include the empty area detection unit described in the second embodiment. The arrival time calculation unit 21 can exclude the imaging target having a low possibility of contact by calculating the arrival time for the area excluding the empty area, and can prevent the erroneous arrival time from being output.

Operation of Image Processing Device

Figure 7:
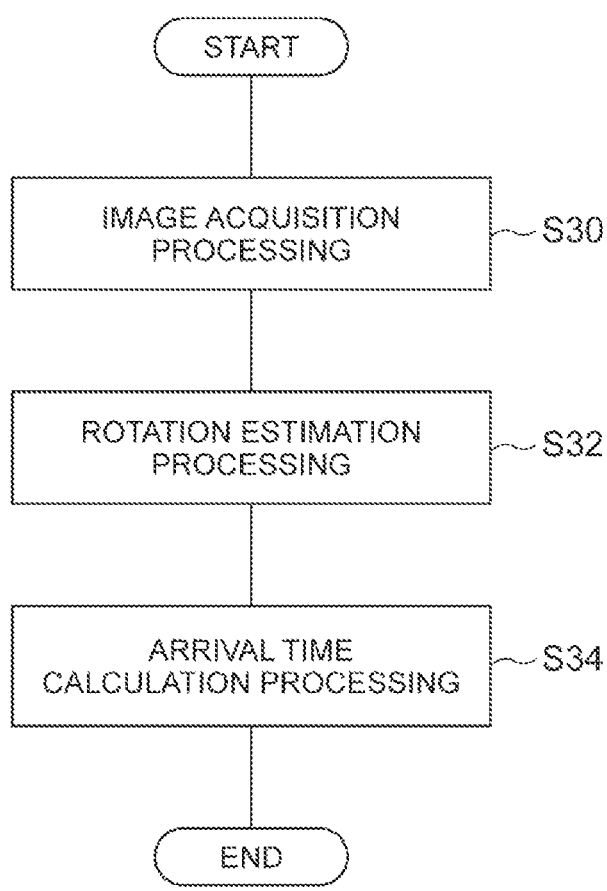
FIG. 7 is a flowchart illustrating an example of an operation by the image processing device in FIG. 6.

FIG. 7 is a flowchart illustrating an example of an operation by the image processing device 1B. The processing in the flowchart illustrated in FIG. 7 starts, for example, when an instruction for starting the operation of the image processing device 1B is received. Hereinafter, it is assumed that the camera 200 outputs moving pictures.

As image acquisition processing (STEP S30), the image acquisition unit 11 acquires an image from the camera 200.

This processing is the same as that in the image acquisition processing (STEP S10) in FIG. 2.

As rotation estimation processing (STEP S32), the rotation estimation unit 18B estimates the rotational movement component relating to at least one of the pitch axis, yaw axis, and roll axis. This process is the same as that in at least one of the first estimation processing (STEP S24) and the second estimation processing (STEP S26) in FIG. 5. As the rotation estimation processing (STEP S32), the rotational velocity component of the axis rotation of the yaw axis, pitch axis, and roll axis may be acquired using the gyro sensor or the like.

As arrival time calculation processing (STEP S34), the arrival time calculation unit 21 calculates the arrival time in which the rotational velocity component relating to at least one of the pitch axis, yaw axis and roll axis is compensated, based on the rotational velocity component estimated by the rotation estimation unit 18B, the "constraint condition assuming that the brightness value of the imaging target does not change due to the relative movement between the camera 200 and the imaging target", and the "relationship between the movement of the camera 200 and the motion vector of each pixel on the image". The arrival time calculation unit 21 calculates the normalized translational velocity $v_r(r)$ using Equation (23) or Equation (24), and then, calculates the arrival time by obtaining the inverse number thereof. When the arrival time calculation processing (STEP S34) ends, the flowchart illustrated in FIG. 7 ends.

Summary of Third Embodiment

The movement of the camera 200 can be divided into the translational movement and the rotational movement. In a case of the camera 200 mounted on the vehicle 2 and monitoring the front, the main movement of the camera 200 is the translational movement component of the traveling direction. However, the movement of the camera 200 also includes the rotational movement component such as the pitch angle velocity due to the unevenness of the road surface and the yaw angle velocity due to turning. Therefore, when the arrival time is calculated using only the translational movement component, the accuracy of the calculated arrival time may deteriorate. On the other hand, in the image processing device 1B, the rotational velocity component relating to at least one axis of the movement of the camera 200 itself is estimated. Then, the arrival time in which the rotational velocity component relating to at least one axis is compensated is calculated based on the estimated rotational velocity component, the constraint condition assuming that the brightness value of the imaging target does not change due to the relative movement of the imaging unit and the imaging target, and the relation between the motion of the imaging unit and the motion vector of each pixel on the image. As described above, since the arrival time in which the rotational velocity component is compensated is estimated, the image processing device 1B can estimate the arrival (collision) time with high accuracy even when the camera 200 vibrates up and down or makes the turning movement. In addition, since the arrival time is directly calculated without estimating the motion vector, the image processing device 1B can realize the estimation of the arrival time with a simple configuration.

Fourth Embodiment

An image processing device 1C according to a fourth embodiment is different from the image processing device 1 in a point that a rotational movement of the camera 200 is estimated, a point that the translational vector normalized by the distance is estimated, and a point that the motion vector in which the pixel movement caused by the movement of the camera 200 is excluded is calculated. Hereinafter, the differences are mainly described, and the descriptions same as that of the first embodiment to the third embodiment will not be repeated.

Configuration of Image Processing Device

Figure 8:
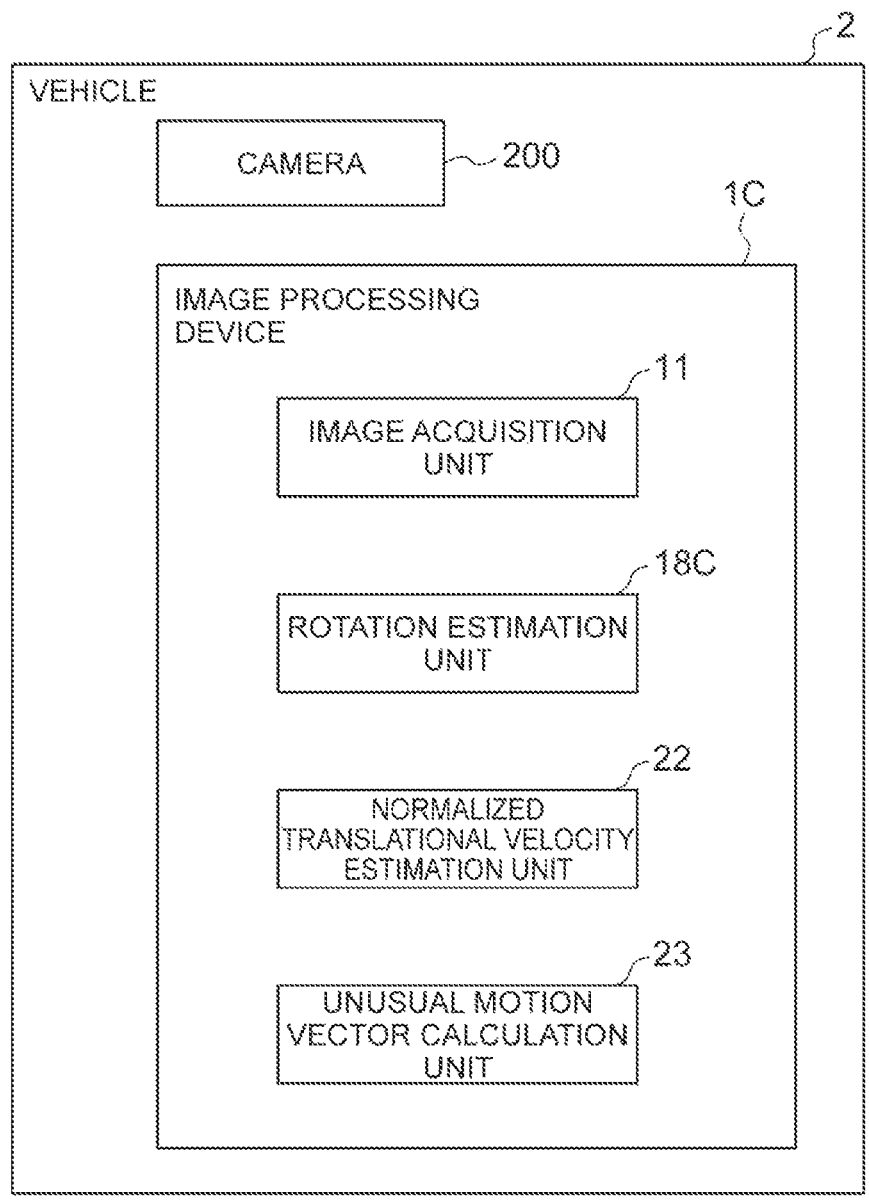
FIG. 8 is a functional block diagram of a vehicle including an image processing device in a fourth embodiment.

FIG. 8 is a functional block diagram of a vehicle including the image processing device in the fourth embodiment. As illustrated in FIG. 8, an image processing device 1C is mounted on the vehicle 2. The vehicle 2 includes a camera 200 and the image processing device 1C. The camera 200 is the same as that in the first embodiment.

The image processing device 1C includes an image acquisition unit 11, a rotation estimation unit 18C, a normalized translational velocity estimation unit 22, and an unusual motion vector calculation unit 23. The image acquisition unit 11 is the same as that in the first embodiment.

The rotation estimation unit 18C estimates a rotational velocity component relating to at least one axis of the movement of the camera 200 itself. The rotation estimation unit 18C may be the same as at least one of the first estimation unit 18 and the second estimation unit 19 in the second embodiment. In this way, the rotational movement component relating to at least one of the pitch axis, yaw axis, and roll axis is estimated.

The normalized translational velocity estimation unit 22 estimates the normalized translational velocity. The normalized translational velocity is a value obtained by dividing the translational velocity of the imaging unit and the imaging target by a distance from the point on the imaging target corresponding to each pixel to the camera 200. Assuming that the imaging target is a rigid body, the motion vector (optical flow) on the image can be defined based on the relative rotational movement between the camera 200 and the imaging target, the normalized translational velocity between the camera 200 and the imaging target, and the coordinates of each pixel. Therefore, when the camera 200 is moving and the imaging target is stationary, the motion vector can be defined based on the rotational movement of the camera 200 and the normalized translational velocity of the camera 200.

The normalized translational velocity estimation unit 22 estimates the normalized translational velocity that is normalized by the distance relating to at least one axis, based on the rotational velocity component estimated by the rotation estimation unit 18C, the "constraint condition assuming that the brightness value of the imaging target does not change due to the relative movement between the camera 200 and the imaging target", and the "relationship between the movement of the camera 200 and the motion vector of each pixel on the image".

The "constraint condition assuming that the brightness value of the imaging target does not change due to the relative movement between the camera 200 and the imaging target" is expressed by Equation (2) or Equation (5) in the first embodiment. The "relationship between the movement of the camera 200 and the motion vector of each pixel on the image" is expressed by Equation (6) or Equation (7) in the first embodiment. The normalized translational velocity estimation unit 22 calculates the normalized translational velocity expressed by Equation (13) using Equation (15). When the translational velocity $T_X$ and $T_Y$ in the X and Y directions can be approximated to zero, Only $V_r(r)$ may be obtained as the normalized translational velocity using Equation (16).

The calculation method of $V_r(r)$ at this time is the same as the method used by the arrival time calculation unit 21 described in the third embodiment.

Furthermore, when there is an area where an empty area (sky) is drawn in the image, the normalized translational velocity estimation unit 22 may calculate the normalized translational velocity in the area excluding the empty area. In this case, the image processing device 1B may include the empty area detection unit described in the second embodiment. The normalized translational velocity estimation unit 22 can prevent the estimation accuracy of the normalized translational velocity from being deteriorating due to saturation of brightness value and absence of texture by calculating the normalized translational velocity of the area excluding the empty area.

When a moving object is included in the imaging target, the motion vector in which a component of a motion of the imaging target is added to the motion vector defined assuming that the imaging target is stationary as described above, is observed as an unusual motion vector. The unusual motion vector is a motion vector that remains when both the rotational movement and the translational movement of the camera 200 are compensated. This unusual motion vector has practically meaningful properties as follows. The first property is a fact that the unusual motion vector becomes zero in a target moving approximately parallel to the camera optical axis such as the stationary target such as the road surfaces and the roadside objects and the preceding vehicles. The second property is a fact that the unusual motion vector appears as a vector representing the direction of the imaging target having the translational movement component in a direction different from the optical axis of the camera 200 such as a preceding vehicle that changes the lanes or a vehicle of head-on collision. In other words, it is possible to selectively take out the typical attentional movements in the traffic environment (for example, movements such as jumping out and interruption).

The unusual motion vector calculation unit 23 calculates the motion vector in which the pixel movement caused by the movement of the camera 200 is excluded, based on the rotational velocity component estimated by the rotation estimation unit 18C, the normalized translational velocity estimated by the normalized translational velocity estimation unit 22, the "constraint condition assuming that the brightness value of the imaging target does not change due to the relative movement between the camera 200 and the imaging target", and the "relationship between the movement of the camera 200 and the motion vector of each pixel on the image". In this way, the unusual motion vector calculation unit 23 can extract only the motion vector caused by the motion of the imaging target, that is, the motion vector of the imaging target that is moving.

The "constraint condition assuming that the brightness value of the imaging target does not change due to the relative movement between the camera 200 and the imaging target" is expressed by Equation (2) or Equation (5) in the first embodiment. The "relationship between the movement of the camera 200 and the motion vector of each pixel on the image" is expressed by Equation (6) or Equation (7) in the first embodiment. When the second-order minute terms (terms including $x^2$, $y^2$, $xy$) are ignored, Equation (6) or Equation (7) is expressed as Equation (12).

When assuming that the second-order minute terms (terms including $x^2$, $y^2$, $xy$) are ignored in Equation (6), and that the translational velocity in the X-axis and Y-axis direction is zero, the optical flow is expressed by following equation as a sum of the components caused by the rotational movement of the camera 200 and the translational movement in the Z-axis direction and other components.

$$v = \Omega_z \begin{bmatrix} y \\ -x \end{bmatrix} + \begin{bmatrix} -f_c\Omega_y \\ f_c\Omega_x \end{bmatrix} + v_r(r)\begin{bmatrix} x \\ y \end{bmatrix} + \begin{bmatrix} v_{ex} \\ v_{ey} \end{bmatrix} \quad (25)$$

Here, other components $[V_{ex}, V_{ey}]$ are optical flows which is the result of removing the components caused by the rotational movement of the camera 200 and the translational movement in the Z-axis direction. Substituting Equation (25) into Equation (2) which is a constraint condition when the camera 200 a CIS camera, Equation (26) is obtained.

$$\left(\Omega_z\begin{bmatrix} y \\ -x \end{bmatrix} + \begin{bmatrix} -f_c\Omega_y \\ f_c\Omega_x \end{bmatrix} + v_r(r)\begin{bmatrix} x \\ y \end{bmatrix} + \begin{bmatrix} v_{ex} \\ v_{ey} \end{bmatrix}\right) \cdot \nabla(g_1 - g_0) + jn\Delta_\omega g_1 = 0 \quad (26)$$

The variables of Equation (26) are converted as follows.

$$\begin{bmatrix} h_x \\ h_y \end{bmatrix} = \nabla(g_1 - g_0)$$

$$h_b = (yh_x - xh_y)\Omega_z + (-f_c\Omega_y h_x + f_c\Omega_x h_y) + (xh_x + yh_y)v_r(r) + j\Delta_\omega g_1$$

As a result, Equation (26) is expressed as following Equation (27).

$$h_x v_{ex} + h_y v_{ey} + h_b = 0 \quad (27)$$

The form of Equation (27) is same as the form of Equation (5) which is a constraint condition when the camera 200 a CIS camera. Therefore, the unusual motion vector calculation unit 23 defines the evaluation function in the same manner as the Lucas & Kanade method or the Horn & Schunck method, and obtains $v_{ex}$ and $v_{ey}$ by minimizing the evaluation function. This motion vector is a motion vector in which the rotational movement of the camera and the translational movement in the optical axis direction are compensated, and becomes zero in the stationary targets such as road surfaces and roadside objects. The motion vector of a target such as a preceding vehicle that moves approximately parallel to the camera optical axis is also compensated to be zero because it is represented by the third term (term of $v_r(r)$) of Equation (14). On the other hand, the motion vector of the imaging target having the translational movement component in a direction orthogonal to the optical axis of the camera 200 such as the preceding vehicle that changes the lanes or a vehicle of head-on collision appears as an unusual motion vector without being compensated.

Operation of Image Processing Device

Figure 9:
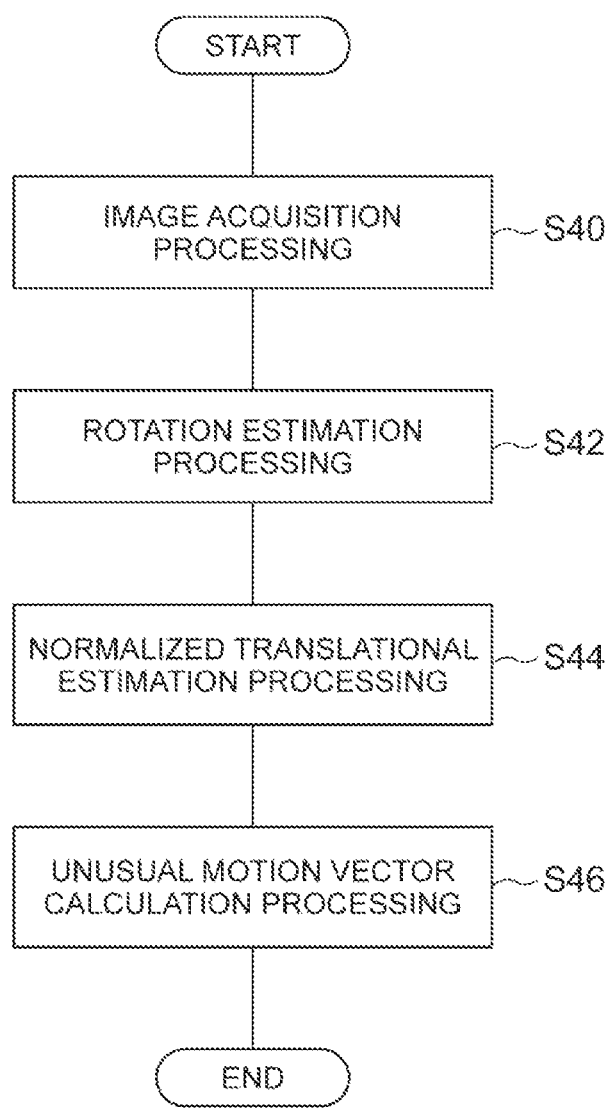
FIG. 9 is a flowchart illustrating an example of an operation by the image processing device in FIG. 8.

FIG. 9 is a flowchart illustrating an example of the operation of the image processing device 1C. The processing in the flowchart illustrated in FIG. 9 starts, for example, when an instruction for starting the operation of the image processing device 1C is received. Hereinafter, it is assumed that the camera 200 outputs moving pictures.

As image acquisition processing (STEP S40), the image acquisition unit 11 acquires an image from the camera 200. This process is the same as the image acquisition processing (STEP S10) in FIG. 2.

As rotation estimation processing (STEP S42), the rotation estimation unit 18C estimates the rotational movement component relating to at least one of the pitch axis, yaw axis, and roll axis. This process is the same as the rotation estimation processing (STEP S32) in FIG. 7. As the rotation estimation processing (STEP S42), the rotational velocity component relating to at least one axis of the pitch axis, yaw axis, and roll axis may be acquired using the gyro sensor or the like.

As normalized translational estimation processing (STEP S44), the normalized translational velocity estimation unit 22 calculates the normalized translational velocity based on the rotational velocity component estimated by the rotation estimation unit 18C, the "constraint condition assuming that the brightness value of the imaging target does not change due to the relative movement between the camera 200 and the imaging target", and the "relationship between the movement of the camera 200 and the motion vector of each pixel on the image". Similarly to the arrival time calculation unit 21, the normalized translational velocity estimation unit 22 calculates the normalized translational velocity using Equation (23) or Equation (24).

As unusual motion vector calculation processing (STEP S46), the unusual motion vector calculation unit 23 calculates the motion vector in which the pixel movement caused by the movement of the camera 200 is excluded, based on the rotational velocity component estimated by the rotation estimation unit 18C, the normalized translational velocity estimated by the normalized translational velocity estimation unit 22, the "constraint condition assuming that the brightness value of the imaging target does not change due to the relative movement between the camera 200 and the imaging target", and the "relationship between the movement of the camera 200 and the motion vector of each pixel on the image". The unusual motion vector calculation unit 23 calculates the unusual motion vector with Equation (27) as the constraint condition. When the unusual motion vector calculation processing (STEP S46) ends, the flowchart illustrated in FIG. 9 ends.

The image processing device 1C may include an unusual movement area extraction unit that extracts an area in which the motion vector equal to or greater than a predetermined value is concentrated among the motion vector calculated by the unusual motion vector calculation unit 23. In this case, the image processing device 1C can extract a moving object having a translational movement component in a direction different from the predetermined direction.

Summary of Fourth Embodiment

The image processing device 1C calculates motion vector in which the motion of the pixel caused by the rotational movement and the translational movement of the camera 200 is excluded, based on the relationship between the movement of the camera 200 and the motion vector of each pixel on the image. Therefore, it is possible to extract only the motion vector caused by the motion of the imaging target, that is, the motion vector of the imaging target that is moving.

Fifth Embodiment

An image processing device 1D in the fifth embodiment is a device in which the functions of the image processing devices in the first embodiment to the fourth embodiment. Hereinafter, the descriptions same as that in the first embodiment to the fourth embodiment will not be repeated.

Configuration of Image Processing Device

Figure 10:
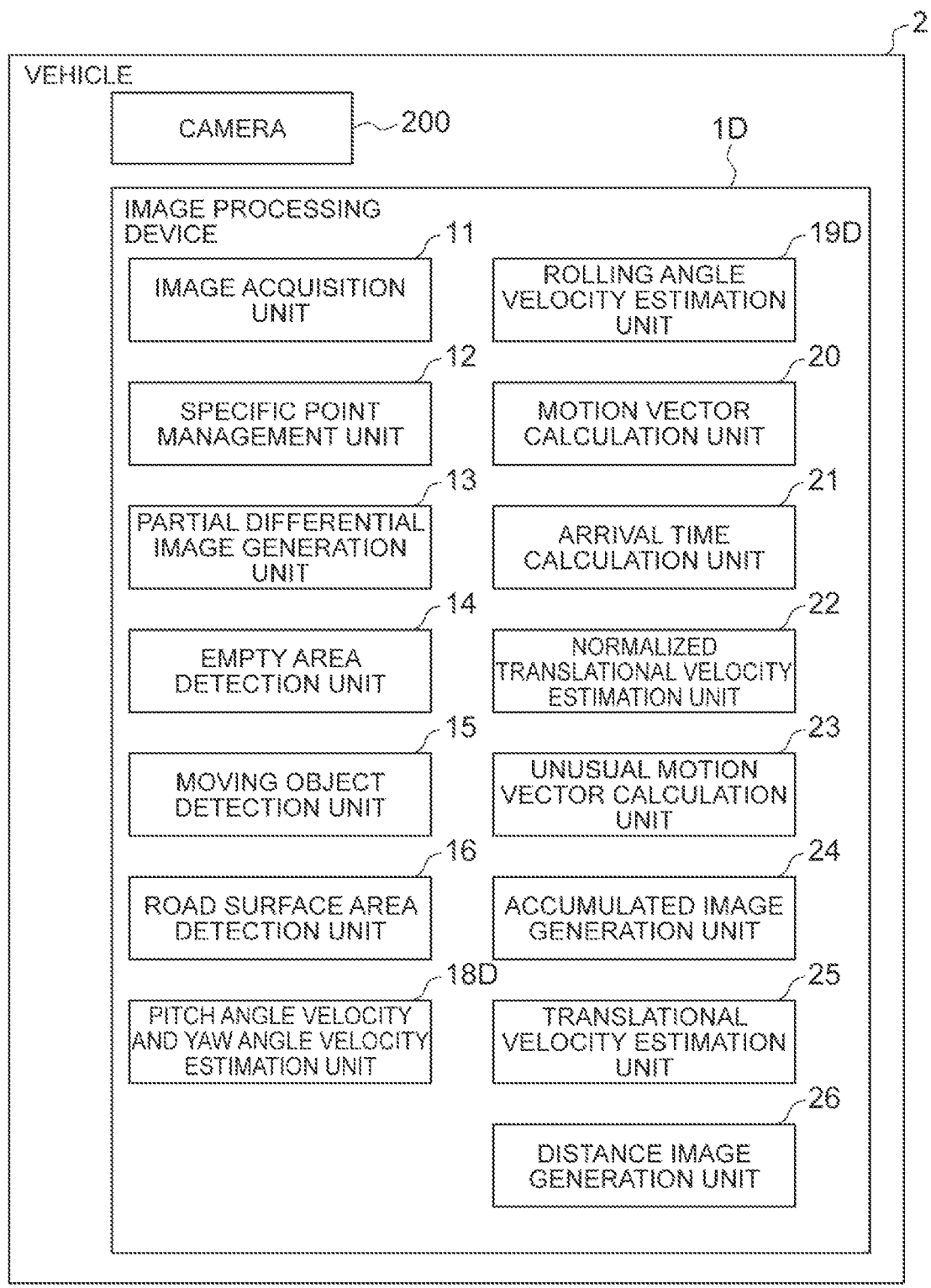
FIG. 10 is a functional block diagram of a vehicle including an image processing device in a fifth embodiment.

FIG. 10 is a functional block diagram of a vehicle including the image processing device in the fourth embodiment. As illustrated in FIG. 10, the image processing device 1D is mounted on the vehicle 2. The vehicle 2 includes a camera 200 and the image processing device 1D. The camera 200 is the same as that in the first embodiment.

The image processing device 1D includes an image acquisition unit 11, a specific point management unit 12, a partial differential image generation unit 13, an empty area detection unit 14, a moving object detection unit 15, a road surface area detection unit 16, a pitch angle velocity and yaw angle velocity estimation unit 18D, a rolling angle velocity estimation unit 19D, a motion vector calculation unit 20, an arrival time calculation unit 21, a normalized translational velocity estimation unit 22, an unusual motion vector calculation unit 23, an accumulated image generation unit 24, a translational velocity estimation unit 25, a distance image generation unit 26, and an image storage unit 30.

The image acquisition unit 11 is the same as that in the first embodiment.

The specific point management unit 12 is the same as that in the first embodiment. Hereinafter, details of template matching to search for specific points will be described. The specific point management unit 12 will be described by way of an example of sequentially updating the specific point. The specific point management unit 12 obtains the coordinates of a current time point corresponding to a specific point stored in the specific point storage unit 123 by matching the image features stored in specific point storage unit 123 with the image features of the frame at the current time point. The image features stored in the specific point storage unit 123 may be an intensity image around the specific point or an accumulated image around the specific point. Immediately after the initialization by the initial setting unit 120, the image of the initialization time point is stored in the specific point storage unit 123. In other cases, the accumulated image generated by the accumulated image generation unit 24 described later is stored. Here, the processing by the specific point management unit 12 will be described for a case where an accumulated image $g_{acc}(x, y, t-1)$ up to previous one time point is stored. The same is applied to the processing for a case where an image of initial time point is stored in the specific point storage unit 123. The matching is performed as illustrated in following Equation (28) using three matching functions $M_t$, $M_x$ and $M_y$.

$$(x_c(t), y_c(t)) = \qquad (28)$$
$$\operatorname{argmin}[M_t(x_c(t), y_c(t)) + M_x(x_c(t), y_c(t)) + M_y(x_c(t), y_c(t))]$$
$$M_t(x_c(t), y_c(t)) =$$
$$\iint_\Sigma \{g_0(x - x_c(t), y - y_c(t)) - g_{acc}(x, y, t-1)\}^2 dxdy$$
$$M_x(x_c(t), y_c(t)) =$$
$$\iint_\Sigma \left\{\frac{\partial}{\partial x} g_0(x - x_c(t), y - y_c(t)) - \frac{\partial}{\partial x} g_{acc}(x, y, t-1)\right\}^2 dxdy$$
$$M_y(x_c(t), y_c(t)) =$$
$$\iint_\Sigma \left\{\frac{\partial}{\partial y} g_0(x - x_c(t), y - y_c(t)) - \frac{\partial}{\partial y} g_{acc}(x, y, t-1)\right\}^2 dxdy$$

Here, it is assumed that the accumulated image $g_{acc}(x, y, t-1)$ has been coordinate transformed such that the specific point becomes the origin, using the coordinates of the specific point stored simultaneously. Each of the matching functions $M_t$, $M_x$, and $M_y$ are differences between the image of current time point and the accumulated image respectively for the intensity value, the partial derivative of the intensity value in the x-direction, and the partial derivative of the intensity value in the y-direction when the coordinate of the image of the current time point is deviated by the specific point (xc (t), yc (t)). In the matching functions $M_t$, $M_x$, $M_y$, the point ($x_c(t)$, $y_c(t)$) at which the sums in the integration interval $\Sigma$ become minimum is made to be a corresponding point of the current time point.

The integration interval $\Sigma$ in above Equation is a local area centered on the origin, and means the surrounding area of the specific point because the accumulated image $g_{acc}$ is coordinate transformed such that the specific point becomes the origin. When the obtained corresponding point coordinate and the optical axis center coordinates are separated by equal to or more than a predetermined value, the initial setting unit 120 sets the specific point near the optical axis center, and stores the specific point in the specific point storage unit 123 together with the image features of the surrounding area. When the vehicle 2 mounting the camera 200 *d* moves on a curved road, when the specific point is significantly separated from the optical axis neighborhood, the specific point is set on a relatively close target, and thus, the assumption that the motion vector near the specific point is caused by only the pitch angle and yaw angle variation of the imaging unit cannot be established. By initializing the specific point at a new optical axis neighborhood point, the assumption that the specific point is at a long distance can be continuously established, and then, it is possible to continue to search for the correspondence point.

The partial differential image generation unit 13 generates a spatial partial differential image with respect to the intensity image $g_0$ and the correlation image $g_1$ in the x-direction and the y-direction. The partial differential image generation unit 13 perform the partial differential operation independently on the intensity image $g_0$ and correlation image $g_1$ and save the result, which is a function same as the function of generating and storing the partial differential image of the motion vector calculation unit 20 in the first embodiment.

The empty area detection unit 14 is the same as the empty area detection unit described in the second embodiment. The moving object detection unit 15 is the same as the moving object detection unit described in the first embodiment.

Figure 11:
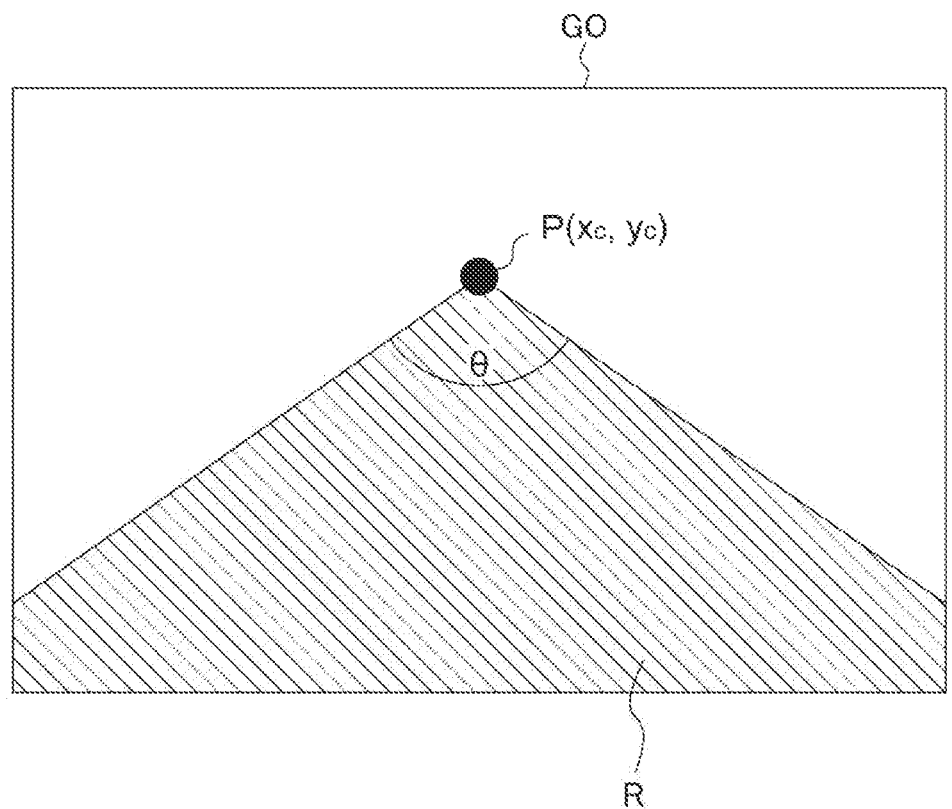
FIG. 11 is a diagram for explaining a geometric definition of a road surface candidate area.

The road surface area detection unit 16 estimates the road surface area from the image. The road surface area detection unit 16 gives a label indicating whether each pixel (x, y) is the road surface or not using the intensity image $g_0$ (x, y, t). Various methods can be used for the road surface area detection. FIG. 11 is a diagram for explaining a geometric definition of a road surface candidate area. As illustrated in FIG. 11, a road surface candidate area R is a partitioned area by two straight lines extending downward with a specific point P($x_c$, $y_c$) set in the image G0 as a base point and the angle therebetween is $\theta$, and an edge of the image. The road surface area detection unit 16 determines whether or not each pixel is the road surface according to the following criteria using the road surface candidate area R illustrated in FIG. 11.

$$\text{roadlabel}(x, y) = \begin{cases} \text{true: if}((x, y) \subseteq R \text{ and skylable}(x, y) = \text{false and} \\ \quad \text{moveable}(x, y) = \text{false}) \\ \text{false: else} \end{cases}$$

Here, a skylabel (x, y) is a label indicating whether or not the pixel is the empty area given by the empty area detection unit 14, and a movelabel (x, y) is a label indicating whether or not the pixel is a moving object given by moving object detection unit 15. The detection method of the road surface area is not particularly limited. As an example, the road surface area detection unit 16 can use a label giving method such as a region growing method or a semantic segmentation.

The pitch angle velocity and yaw angle velocity estimation unit 18D is the same as the first estimation unit 18 described in the second embodiment. The rolling angle velocity estimation unit 19D is the same as the second estimation unit 19 described in the second embodiment.

The motion vector calculation unit 20 calculates an optical flow in which the component caused by the rotational movement of the camera 200 is removed. When the second-order minute terms (terms including $x^2$, $y^2$, xy) are ignored, the optical flow is described by Equation (29) as the component caused by the rotational movement of the camera 200 and the sum of other components. Here, the coordinate is assumed to be coordinate transformed with reference point as the origin.

$$v = \Omega_z \begin{bmatrix} y \\ -x \end{bmatrix} + \begin{bmatrix} -f_c\Omega_y \\ f_c\Omega_x \end{bmatrix} + \begin{bmatrix} v_{gx} \\ v_{gy} \end{bmatrix} \quad (29)$$

Other component [$v_{gx}$, $v_{gy}$] is the optical flow in which the component caused by the rotational movement of the camera 200 is removed. When substituting Equation (29) into Equation (2) which is the constraint condition when the camera 200 a CIS camera, Equation (30) described below is obtained.

$$\left(\Omega_z \begin{bmatrix} y \\ -x \end{bmatrix} + \begin{bmatrix} -f_c\Omega_y \\ f_c\Omega_x \end{bmatrix} + \begin{bmatrix} v_{gx} \\ v_{gy} \end{bmatrix}\right) \cdot \nabla(g_1 - g_0) + j\Delta_\omega g_1 = 0 \quad (30)$$

The variables in Equation (30) is converted into following variables.

$$\begin{bmatrix} h_x \\ h_y \end{bmatrix} = \nabla(g_1 - g_0)$$

$$h_b = (yh_x - xh_y)\Omega_z + (-f_c\Omega_y h_x + f_c\Omega_x h_y) + j\Delta_\omega g_1$$

In this way, Equation (30) is expressed as following Equation (31).

$$h_x v_{gx} + h_y v_{gy} + h_b = 0 \quad (31)$$

The form of Equation (31) is the same as the form of Equation (5) which is a constraint condition when the camera 200 a CIS camera. Therefore, the motion vector calculation unit 20 defines the evaluation function in the same manner as the Lucas & Kanade method or the Horn & Schunck method, and obtains $v_{gx}$ and $v_{gy}$ by minimizing the evaluation function.

The arrival time calculation unit 21 is the same as the arrival time calculation unit 21 described in the third embodiment. The normalized translational velocity estimation unit 22 is the same as the normalized translational velocity estimation unit 22 described in the fourth embodiment. Since the arrival time is an inverse number of the normalized translational velocity, only any one of the arrival time calculation unit 21 and the normalized translational velocity estimation unit 22 may be included. The unusual motion vector calculation unit 23 is the same as the unusual motion vector calculation unit 23 described in the fourth embodiment. The accumulated image generation unit 24 is the same as the accumulated image generation unit described in the first embodiment. The accumulated image generation unit 24 stores the accumulated image around the specific point in the specific point storage unit 123 such that the specific point becomes the origin.

The translational velocity estimation unit 25 estimates the translational velocity $T_z$ based on the distance. In the following, an example will be described where the translational velocity estimation unit 25 initially estimates the distance and estimates the translational velocity $T_z$ based on the estimated distance.

As an example, the translational velocity estimation unit 25 may estimate the distance to an imaging target corresponding to each pixel using a reference environment model. The reference environment model is information for specifying the distance to the imaging target corresponding to each pixel, such as a shape of the road surface and the posture of the camera 200 with respect to the road surface. As an example of the reference environment model, the distance is estimated using the shape of the road surface and the posture of the camera 200 with respect to the road surface. When the road surface is horizontal plane and the optical axis direction of the camera 200 is horizontal and the lateral direction of the image sensor is parallel to the road surface, the distance of the pixel of which the y-coordinate is y is expressed by the following equation.

$$Z = \frac{f_c H_c}{y} \qquad (32)$$

Here, $f_c$ is a focal length of the lens of the camera 200, and $H_c$ is a height of the camera 200 with respect to the road surface. Equation (32) is one of the simplest examples of the reference environment model. As the reference environment model, another model may be used, in which the coordinates of each pixel are associated with the distance to the corresponding imaging target.

Generally, the translational velocity estimation unit 25 estimates the distance to the imaging target using internal parameters and external parameters of the camera 200. The internal parameters and the external parameters of the camera 200 are parameters that associate the coordinates on an image (two-dimensional) when imaging a three-dimensional real space with the camera, with the coordinates of the real space. When these parameters are known, the real space corresponding to each pixel on the image is represented as a straight line. By obtaining a point of intersection of the straight line and, for example, a plane or curved surface (that is, the reference environment model) representing the road surface, the three-dimensional coordinate of the real space and the coordinate on the image can be associated with each other, and then, the distance can be obtained. When 3D terrain information is held as the map information, the translational velocity estimation unit 25 can estimate the distance of each pixel by obtaining the position and posture of the camera 200 on the map using a GPS and a gyro sensor. The translational velocity estimation unit 25 can also use a landmark having position information in the map information such as a building, a billboard, a sign, and the like in addition to the terrain information. In case of indoors, information on the shape of a floor surface, a wall surface, and a ceiling. The translational velocity estimation unit 25 may measure the distance by a sensor such as LIDAR, millimeter wave radar or a stereo camera.

Next, the translational velocity estimation unit 25 estimates the translational velocity $T_z$ based on the estimated distance. The variables of Equation (16) are converted as follows.

$$h_r = \frac{1}{Z(r)} \begin{bmatrix} x \\ y \end{bmatrix} \cdot \nabla(g_1 - g_0)$$

$$h_b = \Omega_z \begin{bmatrix} y \\ -x \end{bmatrix} \cdot \nabla(g_1 - g_0) + \begin{bmatrix} -f_c \Omega_y \\ f_c \Omega_x \end{bmatrix} \cdot \nabla(g_1 - g_0) + j\Delta_\omega g_1$$

In this way, Equation (16) is described as following Equation (33).

$$T_z h_r + h_b = 0 \qquad (33)$$

The form of Equation (33) is the same as the form of Equation (22). Therefore, the translational velocity estimation unit 25 defines the evaluation function in the same manner as the Lucas & Kanade method or the Horn & Schunck method, and obtains the translational velocity $T_z$ by minimizing the evaluation function. Here, the integration interval r is a set of all the pixels of which the distances can be estimated. When using a road surface model, the integration interval is a pixel set where roadlabel (x, y)=true, and when other reference environment model or when the distance is estimated by a distance measurement sensor, the integration interval is a pixel set of which the distances can be estimated.

The translational velocity estimation unit 25 can also estimate the translational velocity $T_z$ based on the estimated distance $Z(r)$ and the normalized translational velocity $v_r(r)$ estimated by the arrival time calculation unit 21 or the normalized translational velocity estimation unit 22. The translational velocity estimation unit 25 may calculate $v_r(r)/Z(r)$ for each pixel in the integration interval where the distance is estimated, may create a histogram, and may use a peak coordinate of the created histogram as an estimated value of the translational velocity $T_z$. The translational velocity estimation unit 25 can improve the estimation accuracy of the translational velocity $T_z$ by the estimation using the histogram.

The distance image generation unit 26 generates a distance image using the estimated normalized translational velocity $v_r(r)$ and the translational velocity $T_z$. The distance of each pixel is obtained by Equation (34).

$$Z(r) = \frac{T_z}{v_r(r)} \qquad (34)$$

Here, in the pixel labeled as the empty area, the calculation of Equation (34) is not performed, and a predetermined value that means infinity is substituted for the distance $Z(r)$.

Operation of Image Processing Device

Figure 12:
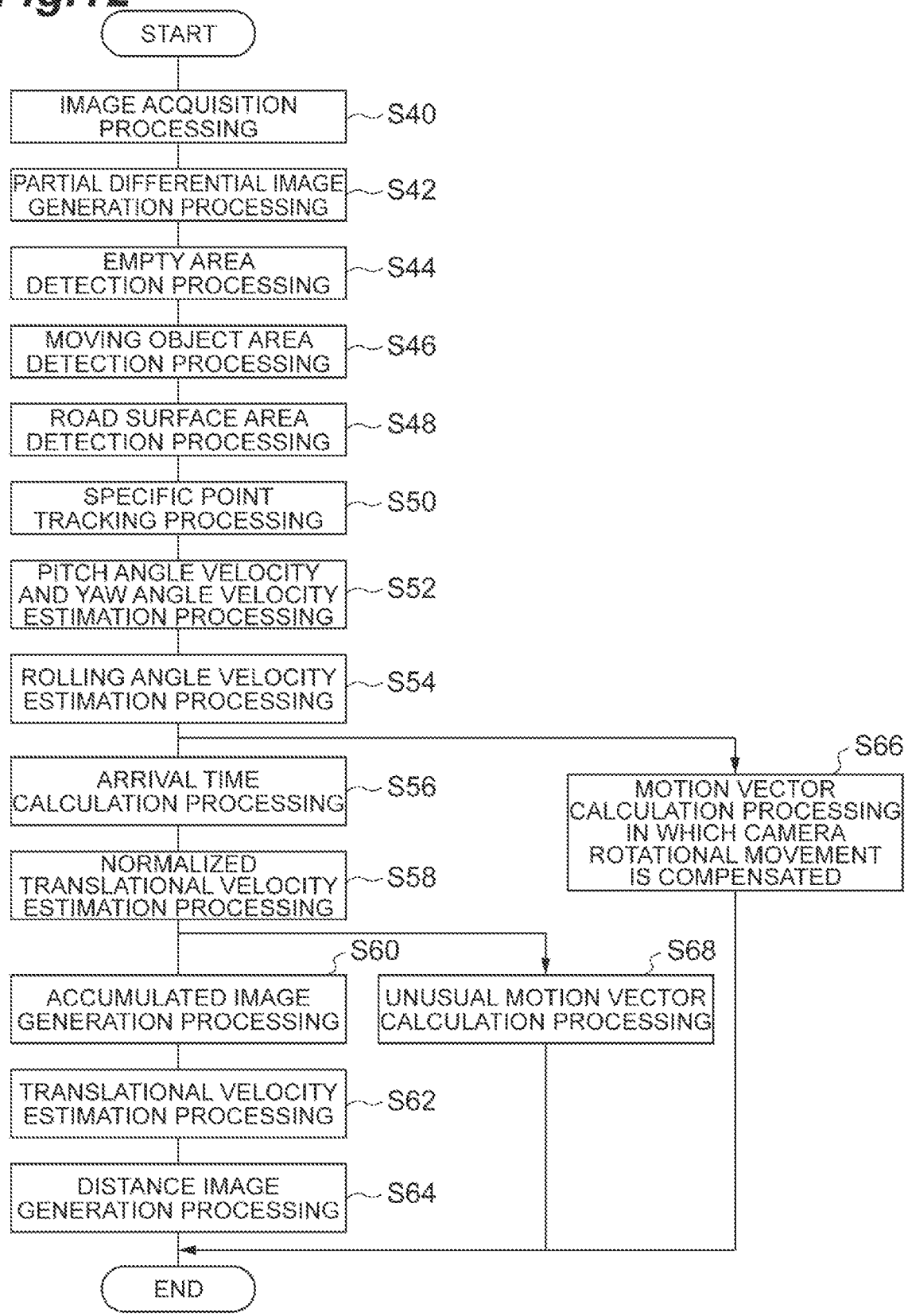
FIG. 12 is a flowchart illustrating an example of an operation by the image processing device in FIG. 10.

FIG. 12 is a flowchart illustrating an example of the operation of the image processing device 1D. The processing in the flowchart illustrated in FIG. 12 starts, for example, when an instruction for starting the operation of the image processing device 1D is received. Hereinafter, it is assumed that the camera 200 is a CIS camera and outputs moving pictures.

First, as image acquisition processing (STEP S40), the image acquisition unit 11 acquires an image from the camera 200. As an example, the image acquisition unit 11 acquires the intensity image $g_0$ and the correlation image $g_1$ at each time point.

Subsequently, as partial differential image generation processing (STEP S42), the partial differential image generation unit 13 creates a partial differential image respectively based on the intensity image $g_0$ and the correlation image $g_1$ acquired in the image acquisition processing (STEP S40). The partial differential image is used for the empty area detection processing in the next stage and the calculation using the constraint condition, and the like.

Subsequently, as empty area detection processing (STEP S44), the empty area detection unit 14 detects an empty area in the intensity image $g_0$ acquired in the image acquisition processing (STEP S40) as an empty area detection process (STEP S44). The empty area is excluded in the calculation of the various estimation values in the subsequent stages because the contrast is small and saturated. In this way, it is possible to prevent the deterioration of the estimation accuracy of the translational velocity caused by the saturation of brightness value and lack of texture.

Subsequently, as moving object area detection processing (STEP 846), the moving object detection unit 15 detects the moving object area in the intensity image $g_0$ acquired in the image acquisition processing (STEP 840). Since the constraint condition (the relationship between the movement of the camera and the optical flow) related to the distance Z expressed in Equation (8) and the translational movement T and the rotational movement Ω is different from that of the stationary object such as the background, the moving object area is excluded from the calculation for estimating the movement of the camera. In addition, the moving object area is also excluded in the calculation for the accumulated image generation.

Subsequently, as road surface area detection processing (STEP S48), the road surface area detection unit 16 detects the road surface area in the intensity image $g_0$ acquired in the image acquisition processing (STEP S40). The road surface area can be used to estimate the distance and as a stationary target object for the estimation of the translational velocity. In estimation of the arrival time, the road surface area is used for the determining whether an non-collision object or not.

Subsequently, as specific point tracking processing (STEP S50), the specific point management unit 12 tracks the specific point defined in the optical axis neighborhood. The initial setting unit 120 of the specific point management unit 12 sets the coordinate of the optical axis center as the position of the specific point at the initial time point, and stores the position of the specific point and the intensity image of the surrounding area of the specific point in the specific point storage unit 123. Other than the initial time point, the position of the specific point and accumulated image of the surrounding area of the specific point is stored in the specific point storage unit 123. By matching the image feature of the intensity image $g_0$ acquired in the image acquisition processing (STEP S40) with the image of the surrounding area of the specific point stored in specific point storage unit 123, the coordinate of the current time point that corresponds to the specific point of previous one time point is obtained. The obtained coordinate is stored in the specific point storage unit 123 as the position of the specific point of the current time point in association with the accumulated image of the surrounding area of the specific point. The position of the specific point (coordinate) is used as a reference coordinate, that, a coordinate origin in various calculation for the estimation later.

Subsequently, as pitch angle velocity and yaw angle velocity estimation processing (STEP S52), the pitch angle velocity and yaw angle velocity estimation unit 18D estimates the pitch angle velocity $\Omega_X$ and yaw angle velocity $\Omega_Y$ of the camera 200 based on the reference point. The pitch angle velocity and yaw angle velocity estimation unit 18D creates a histogram of the motion vector in the surrounding area of the specific point, and estimates the pitch angle velocity and the yaw angle velocity from the peak coordinates of the histogram.

Subsequently, as rolling angle velocity estimation processing (STEP S54), the rolling angle velocity estimation unit 19D estimates the rolling angle velocity $\Omega_Z$ of the intensity image $g_0$ acquired in the image acquisition processing (STEP 840) based on the pitch angle velocity and yaw angle velocity estimated in the pitch angle velocity and yaw angle velocity estimation processing (STEP S52), the "constraint condition assuming that the brightness value of the imaging target does not change due to the relative movement between the camera 200 and the imaging target" and the "relationship between the movement of the camera 200 and the motion vector of each pixel on the image".

All the rotational velocity components of movement of the camera can be obtained by the processing up to this point. Processing next to arrival time calculation processing (STEP S56) described hereinafter and motion vector calculation processing (STEP S66) in which the rotational movement of the camera 200 is compensated can be performed in parallel.

As the arrival time calculation processing (STEP S56), the arrival time calculation unit 21 calculates the arrival time required for the target object corresponding to each pixel in the image to arrive at the camera 200 based on the obtained rotational velocity component of the movement of the camera, the "constraint condition assuming that the brightness value of the imaging target does not change due to the relative movement between the camera 200 and the imaging target" and the "relationship between the movement of the camera 200 and the motion vector of each pixel on the image". In this way, the influence of the rotational movement of the camera 200 can be eliminated. The arrival time calculated here is a value obtained by dividing the distance from the camera 200 to the imaging target by the translational velocity of the camera 200 in the optical axis direction. The inverse number thereof is a normalized translational velocity obtained by normalizing the translational velocity of the camera in the optical axis direction by the distance.

Subsequently, as normalized translational velocity estimation processing (STEP S58), the normalized translational velocity estimation unit 22 calculates the inverse number of the arrival time obtained in the arrival time calculation processing (STEP S56), and obtains the normalized translational velocity.

BY the processing up to this point, the rotational velocity component of the movement of the camera and the normalized translational velocity can be obtained. The processing next to accumulated image generation processing (STEP S60) described hereinafter and unusual motion vector calculation processing (STEP S68) can be performed in parallel.

As the accumulated image generation processing (STEP S60), the accumulated image generation unit 24 generates the accumulated image as a weighted sum of intensity values of the accumulated image up previous one time point and the image of the current time point. In the image features of the surrounding area of the specific point, the position deviates due to the rotational movement of the camera 200, and further, the form is deformed due to the translational movement of the camera 200. Therefore, the accumulated image generation unit 24 by compensates the position and the form, and then, accumulates the intensity values. The accumulated image generation unit 24 stores the generated accumulated images of the specific point of the surrounding area in the specific point storage unit 123.

Subsequently, as translational velocity estimation processing (STEP S62), the translational velocity estimation unit 25 estimates the distance to the imaging target corresponding to each pixel based on the reference environment model using the internal parameters and external parameters of the camera 200, and estimates the translational velocity $T_z$ based on the estimated distance. The translational velocity estimation unit 25 estimates the translational velocity $T_z$ for each pixel by multiplying the distance estimated for each pixel by the inverse number of the normalized translational velocity estimated by the arrival time calculation unit 21. The translational velocity estimation unit 25 creates a histogram of the translational velocity $T_z$ estimated for each pixel, and uses the peak coordinate of the created histogram as the estimated value of the translational velocity $T_z$.

Subsequently, as distance image generation processing (STEP S64), the distance image generation unit 26 generates the distance image based on the normalized translational velocity obtained in the normalized translational velocity estimation processing (STEP S58) and the translational velocity obtained in the translational velocity estimation processing (STEP S62). The distance image generation unit 26 obtains distance information only for the area to which the reference environment model such as the road surface can be applied. The distance image generation unit 26 may generate the distance image based on the assumption that the imaging target is stationary for all the pixels.

The motion vector calculation processing (STEP S66) in which the rotational movement of camera 200 is compensated, which can be performed in parallel with the arrival time calculation processing (STEP S56). The motion vector calculation unit 20 calculates the motion vector in which the rotational movement of the camera 200 is compensated, based on the rotational velocity component of the movement of the camera estimated by the pitch angle velocity and yaw angle velocity estimation unit 18D and the rolling angle velocity estimation unit 19D.

The unusual motion vector calculation processing (STEP S68) will be described, which can be performed in parallel with the accumulated image generation processing (STEP S60). The unusual motion vector calculation unit 23 calculates the unusual motion vector in which the pixel movement caused by the movement of the camera 200 is excluded, based on the rotational velocity component of the movement of the camera estimated by the pitch angle velocity and yaw angle velocity estimation unit 18D and the rolling angle velocity estimation unit 19D, the normalized translational velocity estimated by the normalized translational velocity estimation unit 22, the "constraint condition assuming that the brightness value of the imaging target does not change due to the relative movement between the camera 200 and the imaging target" and the "relationship between the movement of the camera 200 and the motion vector of each pixel on the image".

When the distance image generation processing (STEP S64), the motion vector calculation processing in which the camera rotational movement is compensated (STEP S66), and the unusual motion vector calculation processing (STEP S68) end, the flowchart illustrated in FIG. 12 ends.

Another Example of Operation of Image Processing Device FIG. 12 illustrates an operation example when the camera 200 a CIS camera. When the camera 200 is a general image sensor camera, FIG. 12 may be changed as follows.

In image acquisition processing (STEP S40), the image acquisition unit 11 acquires only the intensity image $g_0$. The intensity image $g_0$ is same as the intensity f in Equation (1).

In the partial differential image generation processing (STEP S42), the partial differential image generation unit 13 calculates following expression in Equation (1).

$$f_x = \frac{\partial f}{\partial x}, f_y = \frac{\partial f}{\partial y}, f_t = \frac{\partial f}{\partial t}$$

The partial differential image generation unit 13 calculates a difference between the consecutive frames for the time partial differential derivative $f_t$.

In the area detection processing (STEP S44), the moving object area detection processing (STEP S46), the road surface area detection processing (STEP S48), and the specific point tracking processing (STEP S50), the processing is the same between a case where the camera 200 is a general image sensor camera and a case where the camera 200 a CIS camera, respectively.

In the pitch angle velocity and yaw angle velocity estimation processing (STEP S52), in order to obtain the main motion vector, the pitch angle velocity and yaw angle velocity estimation unit 18D calculates the optical flow using the Lucas & Kanade method or the Horn & Schunck method based on the constraint condition expressed by Equation (1). The methods for calculating the optical flow is not limited to above-described, and other methods such as block mapping may be used.

In the rolling angle velocity estimation processing (STEP S54), the rolling angle velocity estimation unit 19D estimates the rolling angle velocity by substituting the equation (14) into Equation (1), which is a constraint condition when the camera 200 is a general image sensor camera. When the translational velocity components in the X-axis direction and the Y-axis direction are approximated to zero, Equation (16) can be replaced as follows.

$$\nabla(g_1 - g_0) \to \nabla f j \Delta_\omega g_1 \to f_t$$

In this way, the coefficients $h_\theta$, $h_r$ and $h_b$ in Equation (17) are expressed as following equations.

$$h_\theta = \begin{bmatrix} y \\ -x \end{bmatrix} \cdot \nabla(g_1 - g_0) \to h_\theta = \begin{bmatrix} y \\ -x \end{bmatrix} \cdot \nabla f$$

$$h_r = \begin{bmatrix} x \\ y \end{bmatrix} \cdot \nabla(g_1 - g_0) \to h_r = \begin{bmatrix} x \\ y \end{bmatrix} \cdot \nabla f$$

$$h_b = \Omega_z h_\theta + \begin{bmatrix} -f_c \Omega_y \\ f_c \Omega_x \end{bmatrix} \cdot \nabla(g_1 - g_0) + j\Delta_\omega g_1 \to h_b = \Omega_z h_\theta + \begin{bmatrix} -f_c \Omega_y \\ f_c \Omega_x \end{bmatrix} \cdot \nabla f + f_t$$

As described above, the rolling angle velocity is estimated by Equation (17) as a constraint condition, of which the coefficients are replaced.

In the arrival time calculation processing (STEP S56), the coefficients $h_r$ and $h_b$ in Equation (22) are expressed as following equations.

$$h_\theta = \begin{bmatrix} y \\ -x \end{bmatrix} \cdot \nabla(g_1 - g_0) \to h_\theta = \begin{bmatrix} y \\ -x \end{bmatrix} \cdot \nabla f$$

$$h_r = \begin{bmatrix} x \\ y \end{bmatrix} \cdot \nabla(g_1 - g_0) \to h_r = \begin{bmatrix} x \\ y \end{bmatrix} \cdot \nabla f$$

$$h_b = \Omega_z h_\theta + \begin{bmatrix} -f_c \Omega_y \\ f_c \Omega_x \end{bmatrix} \cdot \nabla(g_1 - g_0) + j\Delta_\omega g_1 \to h_b = \Omega_z h_\theta + \begin{bmatrix} -f_c \Omega_y \\ f_c \Omega_x \end{bmatrix} \cdot \nabla f + f_t$$

The arrival time calculation unit 21 solves Equation (22) by replacing the coefficients as described above.

In the normalized translational velocity estimation processing (STEP S58) and the accumulated image generation processing (STEP S60), the processing is the same between a case where the camera 200 is a general image sensor camera and a case where the camera 200 a CIS camera, respectively.

In the translational velocity estimation processing (STEP S62), the processing is the same between a case where the camera 200 is a general image sensor camera and a case where the camera 200 is a CIS camera. When the normalized translational velocity is not used, the translational velocity estimation unit 25 replaces the coefficients $h_r$ and $h_b$ in Equation (33) as express in following equations.

$$h_r = \frac{1}{Z(r)} \begin{bmatrix} x \\ y \end{bmatrix} \cdot \nabla(g_1 - g_0) \to h_r = \frac{1}{Z(r)} \begin{bmatrix} x \\ y \end{bmatrix} \cdot \nabla f$$

$$h_b = \Omega_z \begin{bmatrix} y \\ -x \end{bmatrix} \cdot \nabla(g_1 - g_0) + \begin{bmatrix} -d\Omega_y \\ f_c \Omega_x \end{bmatrix} \cdot \nabla(g_1 - g_0) + j\Delta_\omega g_1 \to$$

$$h_b = \Omega_z \begin{bmatrix} y \\ -x \end{bmatrix} \cdot \nabla f + \begin{bmatrix} -d\Omega_y \\ f_c \Omega_x \end{bmatrix} \cdot \nabla f + f_t$$

The translational velocity estimation unit 25 solves Equation (33) by replacing the coefficients as described above.

In the distance image generation processing (STEP S64), the processing is the same between a case where the camera 200 is a general image sensor camera and a case where the camera 200 a CIS camera.

In the motion vector calculation processing (STEP S66), in which the rotational movement of the camera is compensated, the motion vector calculation unit 20 calculates the motion vector $[V_g^x, V_g^y]$ by substituting Equation (29) into Equation (1) which is the constraint condition when the camera 200 is a general image sensor camera. The motion vector calculation unit 20 replaces Equation (30) as follows.

$$\nabla(g_1 - g_0) \to \nabla f, j\Delta_\omega g_1 \to f_t$$

In the unusual motion vector calculation processing (STEP S68), the unusual motion vector calculation unit 23 calculates the motion vector $[V_{ex}, V_{ey}]$ by substituting Equation (25) into Equation (1) which is a constraint condition when the camera 200 is a general image sensor camera. The unusual motion vector calculation unit 23 replaces Equation (26) as follows.

$$\nabla(g_1 - g_0) \to \nabla f, j\Delta_\omega g_1 \to f_t$$

Summary of Fifth Embodiment

The image processing device 1D operates a series of processing in which the functions of the image processing devices in the first embodiment to the fourth embodiment are combined. As described above, the functions of the image processing devices in the first embodiment to the fourth embodiment are independent on each other as modules, and can be selectively combined.

Sixth Embodiment

An image processing device 1E in a sixth embodiment differs from the image processing device 1 in a point that the camera is fixed and the imaging target is moving. Hereinafter, the description will be focused on the differences, and the descriptions same as that in the first embodiment to the third embodiment will not be repeated.

The image processing device 1E can be used, for example, in a painting inspection process for parts in the factory automation (FA). For automotive parts that have been painted with a transparent layer containing reflective material, it is necessary to inspect a crack in an inner portion of the transparent layer, as well as the surface thereof. In many of this case, for the final process of painting inspection, it is unavoidable for a person to rely on a visual inspection. Therefore, when a defect is detected, it is practically important to simultaneously specify a position of the defect on the part (hereinafter referred to as coordinates of the part).

Figure 13:
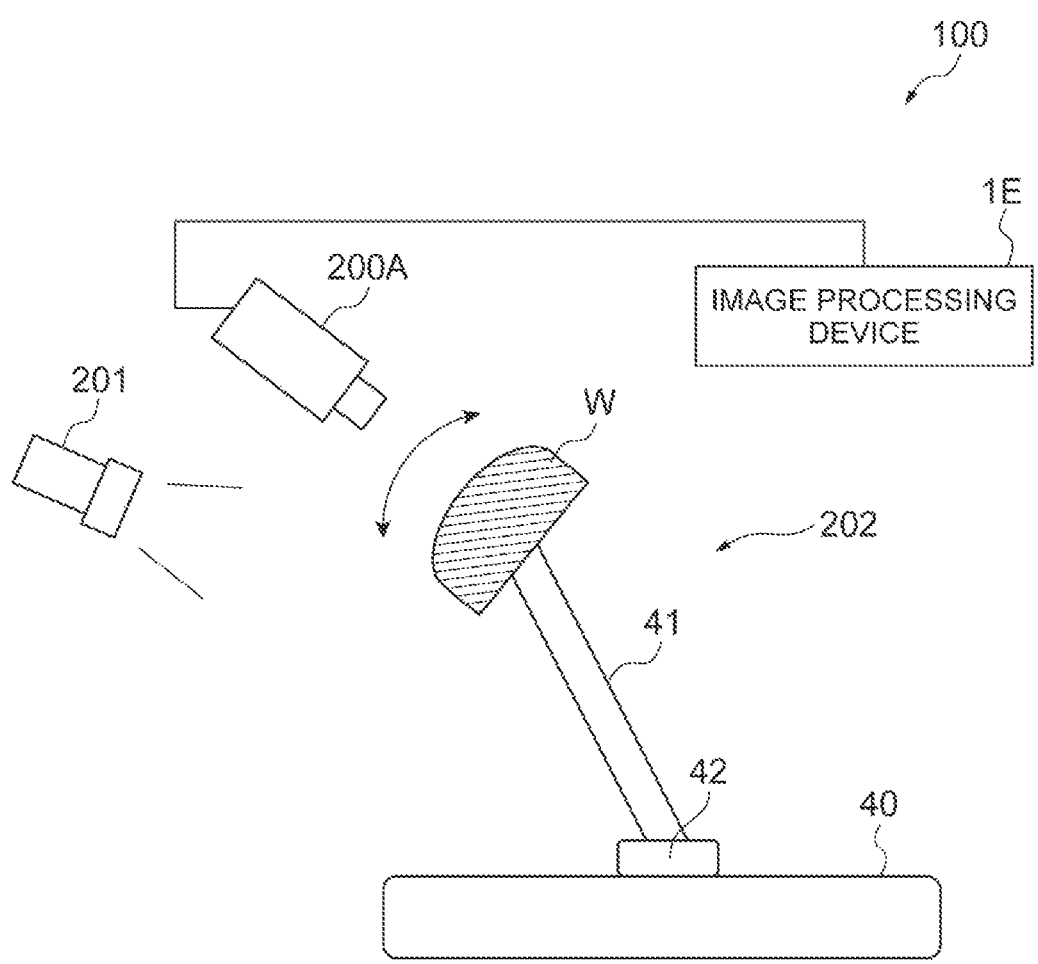
FIG. 13 is a schematic diagram of an inspection system in a sixth embodiment.

FIG. 13 is a schematic diagram of the inspection system in the sixth embodiment. An inspection system 100 shown in FIG. 13 is a system for performing image inspection on a workpiece grasped by an articulated robot. The inspection system 100 includes a camera 200A, an image processing device 1E, a lighting device 201, and an articulated robot 202.

The camera 200A is different from the camera 200 in a point that the camera 200A is fixed, and others are the same. In the camera 200A, imaging conditions are set such that the workpiece W, which is an imaging target, can be imaged with high resolution. The camera 200A may be set such that the resolution for the background is lower than the resolution for the work piece W.

The image processing device 1E is connected to the camera 200A and performs processing on an image captured by the camera 200A. The lighting device 201 emits light to the imaging target. The articulated robot 202 includes an arm 41 extending from a fixed base 40 via a supporting point 42. The arm 41 has a function of grasping an object with a tip. The articulated robot 202 performs operation to grasp the workpiece W at a predetermined distance from the supporting point 42 and to image the workpiece W having various postures with camera 200A.

Figure 14A:
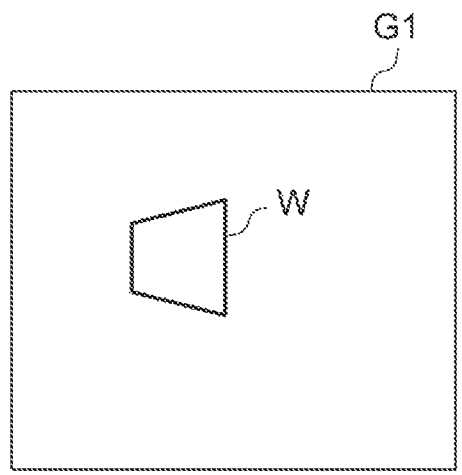
FIG. 14A is an image captured when the workpiece vibrates to the left.
Figure 14B:
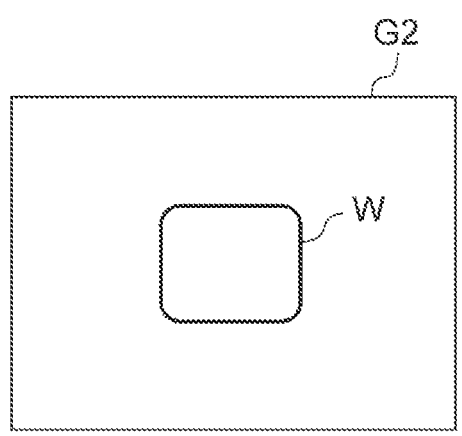
FIG. 14B is an image captured when the workpiece positions at the center.
Figure 14C:
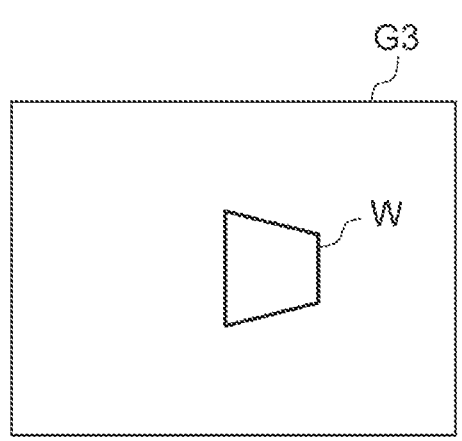
FIG. 14C is an image captured when the workpiece vibrates to the right.

Every time the articulated robot 202 performs the operation, a vibration parallel to the movement direction is generated in the work piece W. Due to this vibration, the deviation between the coordinates on the image and the coordinates of the parts temporally varies. That is, there is a problem in that the coordinates of the part become unstable. FIG. 14A to FIG. 14C are examples of the image illustrating the influence of vibration. FIG. 14A is an image G1 captured when the workpiece W vibrates to the left. FIG. 14B is an image G2 captured when the workpiece positions at the center. FIG. 14C is an image G3 captured when the workpiece W vibrates to the right. Therefore, it is common to capture the image after waiting for ending the vibration, and to detect defects on the obtained image by performing the image processing. Such a waiting time is an obstacle to the efficiency of the inspection process. In particular, when the shape of the imaging target is complicated, it is needed to image the imaging target in a large number of postures, and the problem of waiting time becomes more serious.

The image processing device 1E reduces the waiting time by actively correcting the relative movement of the camera 200A and the imaging target using the technical ideas described in the first embodiment to the fifth embodiment. Furthermore, when there is a defect in the work piece W, the image processing device 1E improves the efficiency of inspection process by stabilizing the coordinates of the part for specifying the position of the defect on the work piece W.

An image captured while moving the work piece W is composed of a background area without the optical flow and an inspection target area where the optical flow of the work piece W is generated. When the concept of setting a reference point in the image disclosed in the above-described embodiments and stabilizing the moving picture image is appropriately applied to such an image, the desired stable image can be obtained even with a fixed camera.

However, in the fixed camera, it is not possible to use the initial value setting method in which the optical axis neighborhood point described in the first embodiment is substituted into the specific point as the initial value. For this reason, the image processing device 1E adopts another reference point setting method for correcting the movement of the imaging target.

The simplest reference point setting method is a method in which the user manually substitutes the specific point. For example, the image acquired by the camera 200A may be displayed on a monitor, and the operator may designate at least one point in the image of the imaging target with a touch pen or a mouse. For example, the image processing device 1E includes a reception unit that receives the user operation specifying the specific point. In this way, the configuration according to the first embodiment can be utilized. In this case, a motion vector is calculated from the image acquired by the camera using the motion of each part of the imaging target which are inked and uniform. Then, an area having a uniform motion vector on the image is extracted. Then, the point corresponding to the manually designated point in the uniform area is set as the initial value, and at least one specific point is stored. The subsequent tracking of the specific points and reference points, and stabilization of the coordinate system of the part are the same as those in the first embodiment.

The defect is detected by applying any defect detection methods to the workpiece W on which a specific point has been designated manually. When the position of the defect on the image is specified, the image processing device 1E has an effect of being able to specify the position of the defect in the coordinate system of the part with high accuracy by stabilizing the coordinates of the part. The initial value of reference point may be set automatically. Hereinafter, an example of the image processing device 1E in which the initial value is automatically set.

Figure 15:
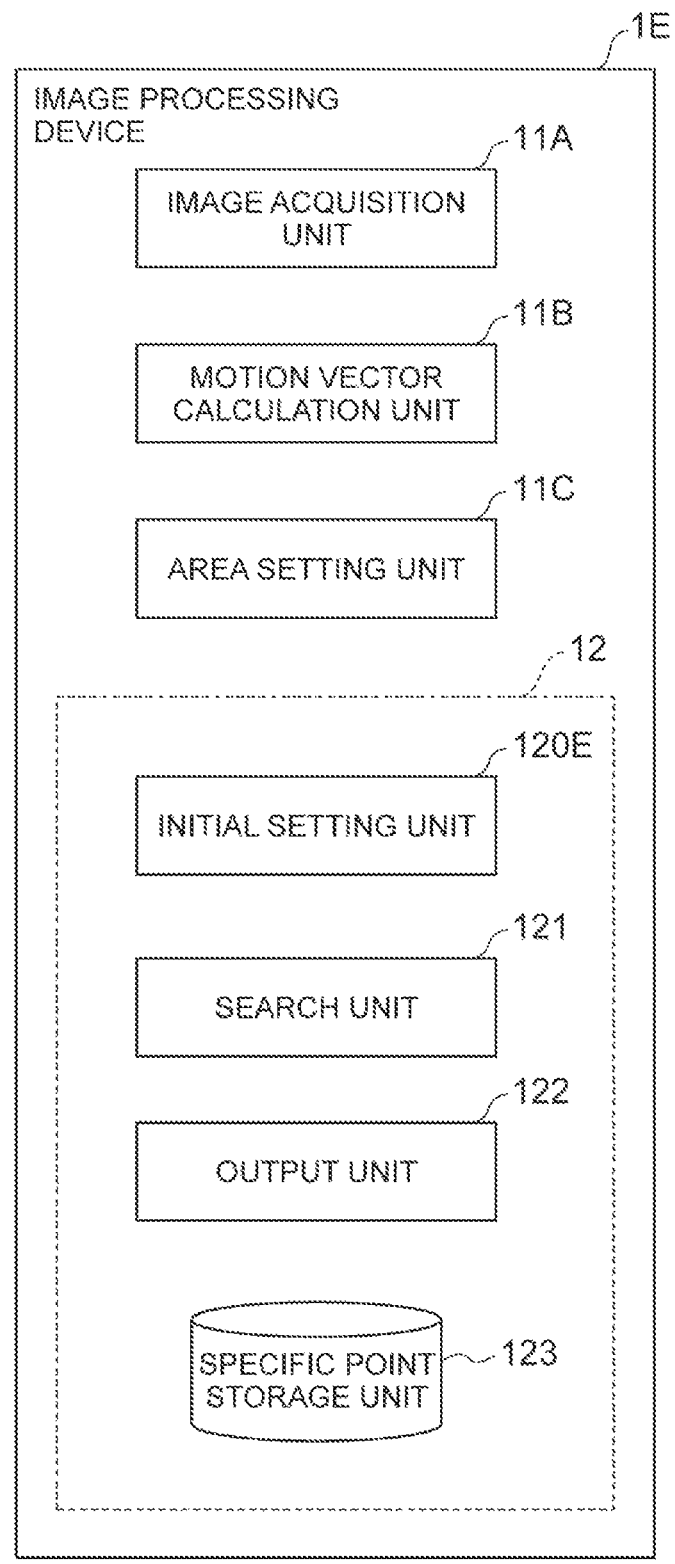
FIG. 15 is a functional block diagram of an image processing device in a sixth embodiment.

FIG. 15 is a functional block diagram of the image processing device in the sixth embodiment. As illustrated in FIG. 15, the image processing device 1E includes an image acquisition unit 11A, a motion vector calculation unit 11B, an area setting unit 11C, and a specific point management unit 12.

The image acquisition unit 11A is the same as the image acquisition unit 11 in the first embodiment.

The motion vector calculation unit 11B calculates a motion vector based on the image. The motion vector calculation unit 11B calculates the motion vector from the image acquired by the camera 200A using the fact that the motion of each part of the imaging target is linked and uniform.

The area setting unit 11C sets an area having a uniform motion vector on the image based on the motion vector calculated by the motion vector calculation unit 11B.

The specific point management unit 12 includes an initial setting unit 120E, a search unit 121, an output unit 122, and a specific point storage unit 123.

The initial setting unit 120E stores the position of the point included in the area set by the area setting unit 11C in the specific point storage unit 123 as an initial position of the specific point in association with the image feature of the surrounding area of the specific point.

Among the areas set by the area setting unit 11C, the initial setting unit 120E may set the point with large spatial information amount as the initial position of the specific point.

The search unit 121 and the output unit 122 are the same as those in the first embodiment.

When the reference point is set by the output unit 122, the specific point management unit 12 may store the image in which the reference point is set. In this case, the specific point management unit 12 includes an accumulated image generation unit that performs coordinate transformation (position matching) based on the reference point for each frame, and stores the accumulated image obtained by accumulating the brightness values of all the frames from the past, in the storage unit. The accumulated image is an image in which the movement of the camera 200 is compensated. The update unit described above may update the specific point storage unit 123 based on the position of the specific point in the accumulated image and the image features of the surrounding area thereof. In the accumulated images, the longer-duration information about the image features of the surrounding area of the specific point is reflected. That is, even if a specific point is temporarily shaded by a moving object in an accumulated image, in other accumulated images, it is possible to obtain the image features relating to the specific point in a situation not being shaded by the moving objects. Therefore, it is possible to stably obtain the corresponding point in time.

When the imaging target is moving relative to the fixed camera 200A, the imaging target may disappear from the screen. Therefore, the image processing device 1E may include a specific point deviation detection unit that detects a fact that the specific point deviates from a predetermined range on the image obtained by the camera 200A, and outputs a specific point deviation signal.

The image processing device 1E may include a warning unit that performs a deviation warning on the user using the specific point deviation signal. The warning unit may notify the user to manually input the initial value of the specific point using the specific point deviation signal. The image processing device 1E may operate the specific point management unit 12 based on the specific point deviation signal and may reset the specific point.

The specific point may disappear from the image acquired by the camera 200A because, for example, the image is out of focus. Therefore, the image processing device 1E may include a specific point disappearance detection unit that detects the disappearance of the specific point and outputs the specific point appearance signal.

The image processing device 1E may include a warning unit that performs deviation warning on the user using the specific point disappearance signal. The warning unit may notify the user to manually input the initial value of the specific point using the specific point deviation signal. The image processing device 1E may operate the specific point management unit 12 based on the specific point disappearance signal and may reset the specific point.

Operation of Image Processing Device

Figure 16:
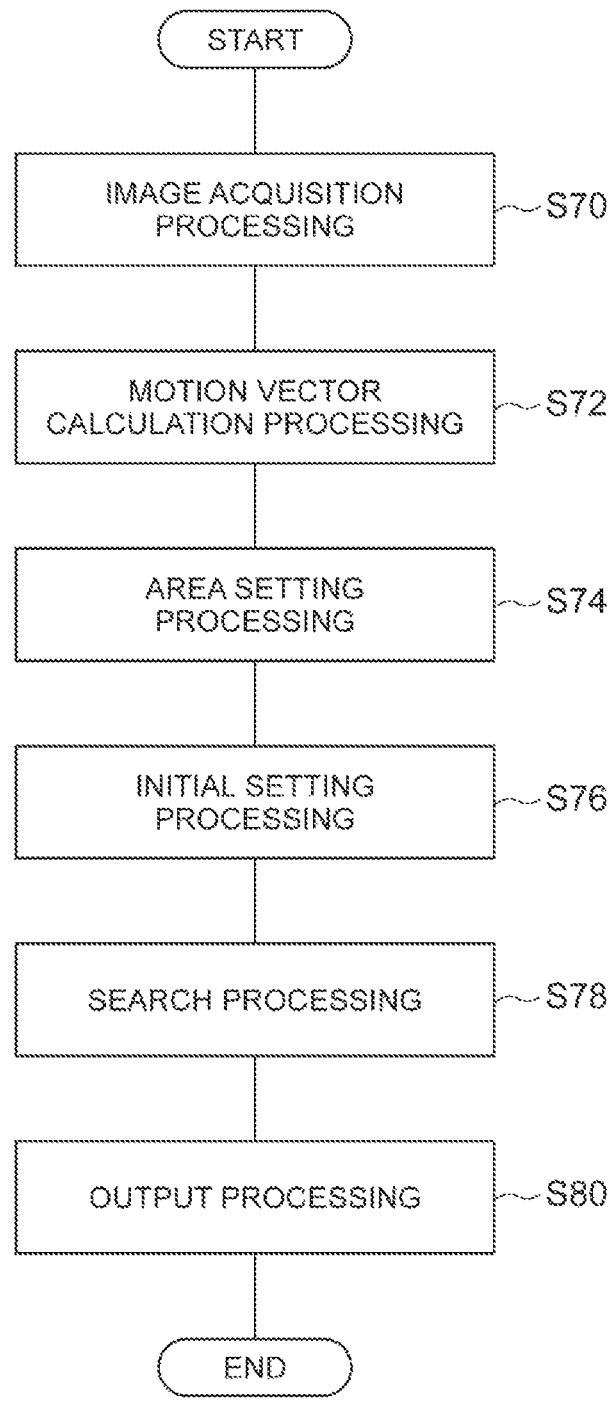
FIG. 16 is a flowchart illustrating an example of an operation by the image processing device in FIG. 15.

FIG. 16 is a flowchart illustrating an example of an operation by the image processing device 1E. The processing in the flowchart illustrated in FIG. 16 starts, for example, when an instruction for starting the operation of the image processing device 1E is received. Hereinafter, it is assumed that the camera 200A is a CIS camera and outputs moving pictures.

As image acquisition processing (STEP S70), the image acquisition unit 11A acquires an image from the camera 200A. This processing is the same as the image acquisition processing (STEP S10) in FIG. 2.

Subsequently, as motion vector calculation processing (STEP S72), the motion vector calculation unit 11B calculates the motion vector based on the image acquired in the image acquisition processing (STEP S70) using the fact that the motion of each part of the imaging target is linked and uniform.

Subsequently, as area setting processing (STEP S74), the area setting unit 1C sets an area having a uniform motion vector on the image based on the motion vector calculated in the motion vector calculation processing (STEP S72).

As initial setting processing (STEP S76), the initial setting unit 120 stores the position of the coordinate point included in the area set in the area setting processing (STEP S74) in the specific point storage unit 123 as the initial position of the specific point of the first frame in association with the image features of the surrounding area of the coordinate point thereof.

As search processing (STEP S78), the search unit 121 searches for the corresponding point of the specific point in the second image obtained in the image acquisition processing (STEP S10) based on the image features of the surrounding area of the specific point stored in the specific point storage unit 123.

As output processing (STEP S80), the output unit 122 outputs the position of the corresponding point of the second frame as the position of the reference point of the second frame. As an example, the output unit 122 outputs the reference point of the second frame to the storage unit of the image processing device 1E so as can be referred to.

When the output processing (STEP S80) ends, the flowchart illustrated in FIG. 16 ends. When processing the third frame following the second frame, the image acquisition unit 11A starts the flowchart illustrated in FIG. 16 from the beginning. At this time, since the specific point storage unit 123 stores the initial position of the specific point, the image acquisition unit 11A may acquire only a third frame which can be the reference point setting target, as the image acquisition processing (STEP S10).

Summary of Sixth Embodiment

In a case of parts having a small feature amount and small motion vector such as plated parts and painted parts, it becomes difficult to associate the first image with the second image. According to the image processing device 1E, even if the feature amount is small, it is possible to associate the recognition targets in each image with each other by setting the reference point in the second image using a point included in the area having a uniform motion vector.

Modification Example

The embodiments described above can be embodied in various forms with various modifications and improvements based on the knowledge of those skilled in the art.

For example, the image processing device 1E in the sixth embodiment can also be applied to a system for imaging a subject on a transport roller.

The camera 200A is described as being fixed in the sixth embodiment, however, the camera 200A may be provided in the arm 41 of the articulated robot 202 or another articulated robot. Even in this case, the relative movement can be corrected in the same manner.

What is claimed is:

1. An image processing device configured to set a reference point on an image obtained by an imaging unit moving in an optical axis direction, comprising:
    a storage unit;
    an initial setting unit configured to store a position of an optical axis neighborhood point in a first image obtained by the imaging unit in the storage unit as an initial position of a specific point in the first image in association with image features of a surrounding area of the optical axis neighborhood point;
    a search unit configured to search for a corresponding point of the specific point in a second image obtained by the imaging unit based on the image features stored in the storage unit; and
    an output unit configured to output a position of the corresponding point in the second image as a position of the reference point in the second image.

2. The image processing device according to claim 1, further comprising:
    a motion vector calculation unit configured to calculate a relative motion vector between a pixel and the reference point in each pixel of the second image.

3. An image processing device configured to estimate a rotational movement of an imaging unit moving in an optical axis direction, based on an image obtained by the imaging unit, comprising:
    a setting unit configured to set an optical axis neighborhood point in the image as a specific point;
    a first estimation unit configured to estimate a rotational velocity component of at least one axial rotation of a first axis and a second axis parallel to an imaging plane of the imaging unit, orthogonal to each other among rotational velocity components, based on a motion vector in a surrounding area of the specific point; and
    a second estimation unit configured to estimate a rotational velocity component of an axial rotation of a third axis, which is a straight line connecting the specific point and an optical center of the imaging unit, based on the rotational velocity component estimated by the first estimation unit, a constraint condition assuming that a brightness value of an imaging target does not change due to a relative movement between the imaging unit and the imaging target, and a relationship between the movement of the imaging unit and the motion vector of each pixel on the image.

4. An image processing device configured to calculate an arrival time until an imaging unit moving in an optical axis direction arrives at an imaging target, based on an image obtained by the imaging unit, comprising:
    a rotation estimation unit configured to estimate a rotational velocity component relating to at least one axis of a movement of the imaging unit itself; and an arrival time calculation unit configured to calculate an arrival time in which the rotational velocity component relating to at least one axis is compensated, based on the rotational velocity component estimated by the rotation estimation unit, a constraint condition assuming that a brightness value of the imaging target does not change due to a relative movement between the imaging unit and the imaging target, and a relationship between the movement of the imaging unit and motion vector of each pixel on the image.

5. An image processing device configured to calculate a motion vector in which a motion of an imaging unit moving in an optical axis direction is compensated based on an image obtained by the imaging unit, comprising:

a rotation estimation unit configured to estimate a rotational velocity component relating to at least one axis of a movement of the imaging unit itself;

a normalized translational velocity estimation unit configured to estimate a translational velocity that is normalized by a distance relating to at least one axis, based on the rotational velocity component estimated by the rotation estimation unit, a constraint condition assuming that a brightness value of an imaging target does not change due to a relative movement between the imaging unit and the imaging target, and a relationship between the movement of the imaging unit and the motion vector of each pixel on the image, and an unusual motion vector calculation unit configured to calculate a motion vector excluding a motion of a pixel caused by a motion of the imaging unit, based on the rotational velocity component estimated by the rotation estimation unit, the translational velocity estimated by the normalized translational velocity estimation unit, a constraint condition assuming that a brightness value of the imaging target does not change due to a relative movement between the imaging unit and the imaging target, and a relationship between the movement of the imaging unit and the motion vector of each pixel on the image.

6. An image processing device configured to set a reference point in a second image obtained by an imaging unit using a specific point in a first image obtained by a fixed imaging unit, comprising:

a storage unit;

a motion vector calculation unit configured to calculate a motion vector based on the first image;

an area setting unit configured to set an area having a uniform motion vector in the first image based on the motion vector calculated by the motion vector calculation unit;

an initial setting unit configured to store a position of the point included in the area in the storage unit as an initial position of the specific point in association with an image feature of a surrounding area of the specific point;

a search unit configured to search for a corresponding point of the specific point in the second image based on the image feature stored in the storage unit; and an output unit configured to output the position of the corresponding point in the second image as a position of a reference point in the second image.

\* \* \* \* \*